US012712391B2

(12) United States Patent
Moffatt et al.

(10) Patent No.: US 12,712,391 B2
(45) Date of Patent: Aug. 18, 2026

(54) RESONANT WIRELESS POWER SOURCE HAVING COUPLED RESONATORS OSCILLATING IN A SINGLE RESONANT EIGENMODE

(71) Applicant: Etherdyne Technologies, Inc., Palo Alto, CA (US)

(72) Inventors: Robert A. Moffatt, Palo Alto, CA (US); Jeffrey J. Yen, Palo Alto, CA (US); Feng-Kai Chen, Palo Alto, CA (US); Jon P. Baker, Palo Alto, CA (US)

(73) Assignee: ETHERDYNE TECHNOLOGIES, INC., Palo Alto, CA (US)

( * ) Notice: Subject to any disclaimer, the term of this patent is extended or adjusted under 35 U.S.C. 154(b) by 861 days.

(21) Appl. No.: 17/758,716

(22) PCT Filed: Jan. 13, 2021

(86) PCT No.: PCT/US2021/013173
§ 371 (c)(1),
(2) Date: Jul. 13, 2022

(87) PCT Pub. No.: WO2021/146235
PCT Pub. Date: Jul. 22, 2021

(65) Prior Publication Data

US 2023/0070683 A1 Mar. 9, 2023

Related U.S. Application Data

(60) Provisional application No. 62/961,040, filed on Jan. 14, 2020.

(51) Int. Cl.
*H02J 50/12* (2016.01)
*H02J 50/00* (2016.01)

(52) U.S. Cl.
CPC ............ *H02J 50/12* (2016.02); *H02J 50/005* (2020.01)

(58) Field of Classification Search
CPC .......... H02J 50/00; H02J 50/001; H02J 50/20; H02J 50/12; H02J 50/27; H02J 50/402; H02J 50/80
See application file for complete search history.

(56) References Cited

U.S. PATENT DOCUMENTS 7,813,709 B2 * 10/2010 Yamamoto ............ H01Q 19/30 343/893
8,362,651 B2 * 1/2013 Hamam .................. H04B 5/79 307/104

(Continued)

FOREIGN PATENT DOCUMENTS

TW 201728035 A 8/2017
TW 201732311 A 9/2017

OTHER PUBLICATIONS

R. A. Moffatt, T. Howarth, C. Gafner, J. J. Yen, F.-K. Chen and J. Yu, "A Distributed, Phase-locked, Class-E, RF Generator with Automatic Zero-Voltage Switching," 2019 IEEE Wireless Power Transfer Conference (WPTC), London, UK, 2019, pp. 390-394, doi: 10.1109/WPTC45513.2019.9055602. (Year: 2019).*

(Continued)

*Primary Examiner* — Julian D Huffman
*Assistant Examiner* — Sadia Kousar
(74) *Attorney, Agent, or Firm* — Perilla Knox & Hildebrandt LLP; Kenneth A. Knox

(57) ABSTRACT

Various embodiments for tuning systems of coupled resonators are described to achieve a desired arrangement of RF current magnitudes and directions, and with a coupled resonant eigenfrequency equal to the desired driving frequency.

12 Claims, 16 Drawing Sheets

(56) References Cited

U.S. PATENT DOCUMENTS

| | | | | |
|---|---|---|---|---|
| 10,044,230 | B2 | 8/2018 | Moffatt et al. | |
| 10,250,078 | B2 | 4/2019 | Moffatt et al. | |
| 10,523,059 | B2 | 12/2019 | Moffatt et al. | |
| 10,892,649 | B2 | 1/2021 | Moffatt | |
| 10,931,149 | B2 | 2/2021 | Moffatt et al. | |
| 10,957,480 | B2 | 3/2021 | Moffatt | |
| 2009/0284083 | A1* | 11/2009 | Karalis | H02J 50/12 307/104 |
| 2010/0259110 | A1 | 10/2010 | Kurs et al. | |
| 2012/0193997 | A1 | 8/2012 | Hong et al. | |
| 2013/0207603 | A1* | 8/2013 | Kappeler | H02J 50/12 320/108 |
| 2013/0234509 | A1 | 9/2013 | Ichikawa et al. | |
| 2014/0062211 | A1 | 3/2014 | Hamam et al. | |
| 2017/0085112 | A1 | 3/2017 | Leabman | |
| 2017/0085126 | A1 | 3/2017 | Leabman | |
| 2018/0191189 | A9 | 7/2018 | Leabman | |
| 2018/0331582 | A1 | 11/2018 | Moffatt | |
| 2020/0006987 | A1 | 1/2020 | Moffatt et al. | |
| 2020/0067350 | A1 | 2/2020 | Moffatt | |
| 2020/0212718 | A1 | 7/2020 | Moffatt et al. | |
| 2020/0313464 | A1 | 10/2020 | Leabman | |
| 2021/0175748 | A1 | 6/2021 | Moffatt et al. | |

OTHER PUBLICATIONS

International Search Report and Written Opinion for PCT/US2021/013173 mailed Apr. 15, 2021.

First Office Action for TW Patent Application No. 110101286 mailed May 22, 2022.

Office Action for European Patent Application No. 21741975.3 mailed Jan. 22, 2026.

* cited by examiner $I_{10}$ 110j
$I_9$ 110i
$I_8$ 110h
$I_7$ 110g
$I_{11}$ 110k
$I_{12}$ 110l
$I_5$ 110e
$I_6$ 110f
$I_{14}$ 110o
$I_{13}$ 110m
$I_4$ 110d
$I_3$ 110c
$I_{15}$ 110p
$I_{16}$ 110n
$I_1$ 110a
$I_2$ 110b
100

RESONANT WIRELESS POWER SOURCE HAVING COUPLED RESONATORS OSCILLATING IN A SINGLE RESONANT EIGENMODE

CROSS-REFERENCE TO RELATED APPLICATIONS

This application is a national stage entry pursuant to 35 U.S.C. § 371 of international application no. PCT/US2021/0131738, filed on Jan. 13, 2021 which claims the benefit of and priority to U.S. Provisional Patent Application No. 62/961,040 entitled "RESONANT WIRELESS POWER SOURCE HAVING COUPLED RESONATORS OSCILLATING IN A SINGLE RESONANT EIGENMODE," filed Jan. 14, 2020, where both of which are incorporated by reference herein in their entireties.

BACKGROUND

The recent proliferation of small sensors and Internet-of-Things (IoT) technology has introduced new needs for powering large numbers of small devices within large predefined volumes. Because wires limit device mobility and batteries place limitations on device functionality and lifetime, a wireless power solution is desirable.

One such solution is a resonant magnetic wireless power system which fills a certain volume of space with an oscillating magnetic field. Resonant dipole receivers may freely move about this space and receive power from the field generated by a radio frequency (RF) source. In some situations, a magnetic field created by a simple current loop is adequate. However, in other situations, a more complex field pattern may be required.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a resonant wireless power source comprising multiple coupled resonators oscillating in a single resonant eigenmode. According to various embodiments described herein, a radio frequency (RF) power source is described that includes multiple, coupled resonators configured in such a manner that they create one or more complex field patterns.

Resonant wireless power transfer utilizes resonant dipole receivers which absorb power from an oscillating ambient field. In general, both the dipoles and the ambient field may be electric, magnetic, or some combination thereof. For example, magnetic dipoles and magnetic fields may be utilized due to their weaker interaction with the human body. It is assumed that the receivers only need to receive power when they are within a certain pre-defined volume of space. If an RF power source allows a significant magnetic field to exist outside of this space, system efficiency will be reduced, either by radiative or eddy-current losses, or else by dilution of the energy density within the pre-defined volume.

Therefore, depending on a shape of a region to be powered, it may be necessary to create a magnetic field pattern which is more complex than that of a simple magnetic loop antenna. According to various embodiments described herein, an RF source having multiple coupled resonators are described as a way of creating complex field patterns. Further, embodiments described herein describe a source field that may be shaped by tuning additional degrees of freedom which a system described herein provides.

Figure 1:
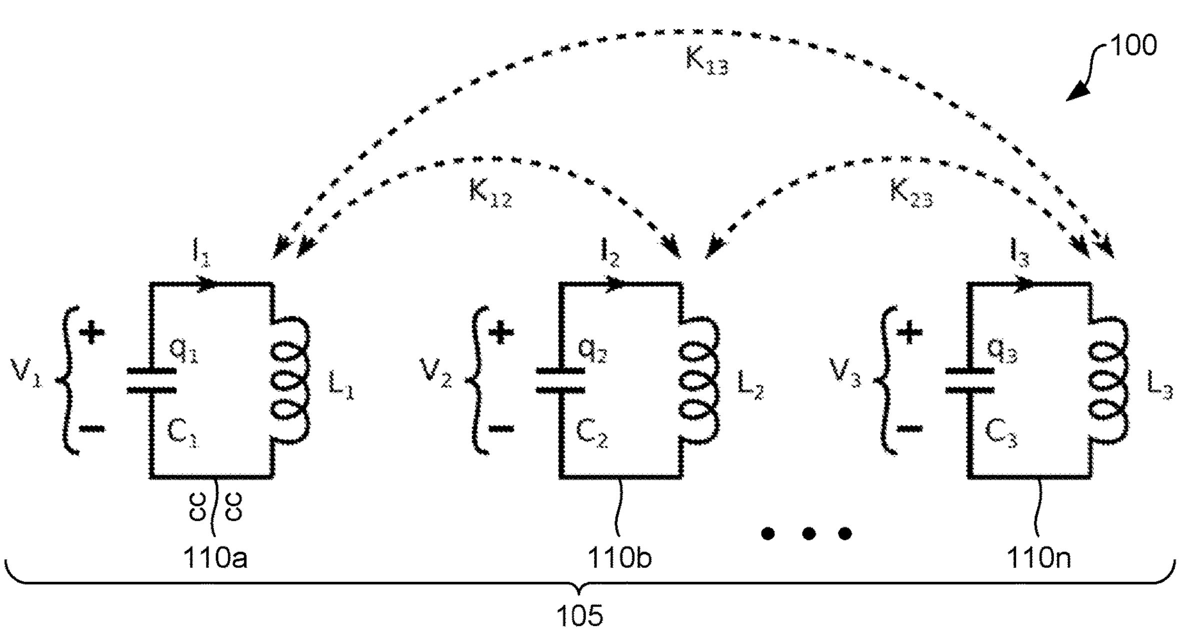
FIG. 1 is an example circuit diagram showing a system having multiple coupled resonators according to various embodiments of the present disclosure.

FIG. 1 shows an example a wireless power transfer system 100 comprising an RF power source 105, where the RF power source 105 comprises multiple coupled resonators 110*a* . . . 110*n* (collectively "coupled resonators 110"). In other words, the wireless power transfer system 100 may include N coupled resonators 110, where N is equal to or greater than two. The N coupled resonators 110 have N eigenmodes of oscillation, each with a corresponding resonant eigenfrequency. In order to efficiently utilize the coupled resonators 110 as a wireless power source in a wireless power transfer system 100, a driving frequency may be set to be equal to one of these resonant eigenfrequencies.

If the eigenmodes have sufficiently high quality factor, and are sufficiently spaced in frequency that their resonant response curves do not overlap, then only the eigenmode whose frequency is equal to the driving frequency is excited. The amplitudes of all other eigenmodes are suppressed. This allows the driven eigenmode to be excited by an RF generator connected to any one of the resonators.

Designing an Eigenmode. Let $L_n$ and $C_n$ denote the inductance and capacitance of the nth resonator, respectively. Let $q_n$ denote the charge stored on the nth capacitor, and let $I_n$ denote the current flowing through the nth inductor.

Suppose it is desirable for the wireless power transfer system 100 to have an eigenmode with an eigenvector of current amplitudes given by $I_n$, and with a corresponding eigenfrequency equal to a desired angular drive frequency, co. Let the direction of the current be defined such that the following relation holds between the charge, $q_n$, and the current, $I_n$:

$$I_n = -j\omega q_n. \quad \text{(Eq. 1)}$$

The relation between the voltage, $V_n$, across the nth capacitor and the charge, $q_n$ is denoted by:

$$q_n = C_n V_n. \quad \text{(Eq. 2)}$$

The voltage across the capacitor, $C_n$, must also be equal to the voltage induced in the nth inductor:

$$V_n = \sum_{m=1}^{N} j\omega M_{nm} I_m. \quad \text{(Eq. 3)}$$

where $M_{nm}$ is the mutual inductance between the nth and mth inductors. Let the self-inductance, $L_n$, of the nth resonator be defined as:

$$L_n = M_{nm}. \quad \text{(Eq. 4)}$$

The following matrix equations may be defined:

$$I = -j\omega q. \quad \text{(Eq. 5)}$$

$$q = CV. \quad \text{(Eq. 6)}$$

$$V = j\omega MI. \quad \text{(Eq. 7)}$$

where I, q, and V are N×1 column vectors, M is the N×N mutual inductance matrix, and C is an N×N diagonal matrix where the diagonal elements are given by:

$$C_{nn} = C_n. \quad \text{(Eq. 8)}$$

Eqs. 5, 6, and 7 may be combined to yield the following eigenvector equation:

$$I = \omega^2 CMI. \quad \text{(Eq. 9)}$$

If M and C are known, then Eq. 9 may be used to solve for the eigenvectors, I, and eigenfrequencies, ω, of all of the eigenmodes. However, in this case, it may be assumed that ω, M, and I are known, and a matrix C may be found that guarantees the existence of an eigenmode with angular frequency, co, and current eigenvector, I. The fact that C is diagonal allows Eq. 9 to be simplified to:

$$I_n = \omega^2 C_n \sum_{m=1}^{N} M_{nm} I_m. \quad \text{(Eq. 10)}$$

Eq. 10 can be solved to give the values of all of the capacitors, $C_n$:

$$C_n = \frac{I_n}{\omega^2 \sum_{m=1}^{N} M_{nm} I_m}. \quad \text{(Eq. 11)}$$

Eq. 11 may be rewritten as a solution for the reactance, $X_n$, of the nth capacitor:

$$X_n \equiv \frac{1}{\omega C_n} = \frac{\sum_{m=1}^{N} \omega M_{nm} I_m}{I_n}. \quad \text{(Eq. 12)}$$

Eq. 12 clearly shows that the reactance of the nth capacitor is equal to the ratio of the induced voltage to the current flowing in the nth resonator.

Impedance-Independent Eigenmode Solution. In some embodiments, it may be useful to solve for parameters of the resonators which are independent of their impedance. The impedance-independent parameters may be defined as follows. Let the dimensionless coupling matrix, K, be defined as:

$$K \equiv L^{-1/2} M L^{-1/2}. \quad \text{(Eq. 13)}$$

where L is an N×N diagonal matrix with diagonal elements given by:

$$L_{nn} = L_n. \quad \text{(Eq. 14)}$$

Note that $K_{nn}=1$. Let the amplitude vector, α, be defined as:

$$a \equiv L^{1/2} I. \quad \text{(Eq. 15)}$$

In terms of these quantities, Eq. 9 may be rewritten as the following eigenvector equation:

$$a = \omega^2 \Omega^{-2} K a. \quad \text{(Eq. 16)}$$

where Ω is an N×N diagonal matrix given by:

$$\Omega^{-2} = L^{-1/2} C L^{-1/2} = LC. \quad \text{(Eq. 17)}$$

The diagonal elements, $\omega_n$, of Ω are:

$$\omega_n \equiv \Omega_{nm} = \frac{1}{\sqrt{L_n C_n}}. \quad \text{(Eq. 18)}$$

Therefore, the diagonal element, $\omega_n$, is equal to the intrinsic angular resonant frequency of the nth resonator when it is decoupled from the rest of the system. As before, the fact that Ω is diagonal allows us to simplify Eq. 16 as follows:

$$a_n = \omega^2 \omega_n^{-2} \sum_{m=1}^{N} K_{nm} a_m. \quad \text{(Eq. 19)}$$

Assuming that all of the components of the amplitude eigenvector, α, are known, Eq. 19 may be solved to give the ratio of the intrinsic angular resonant frequencies, $\omega_n$, of all of the resonators to the angular frequency of the eigenmode, ω:

$$\frac{\omega_n}{\omega} = \sqrt{\sum_{m=1}^{N} K_{nm} \frac{a_m}{a_n}}. \quad \text{(Eq. 20)}$$

where the constants, $\epsilon_n$, are defined to be:

$$\epsilon_n \equiv \sum_{m=1}^{N} K_{nm} \frac{a_m}{a_n}. \quad \text{(Eq. 21)}$$

Figure 2:
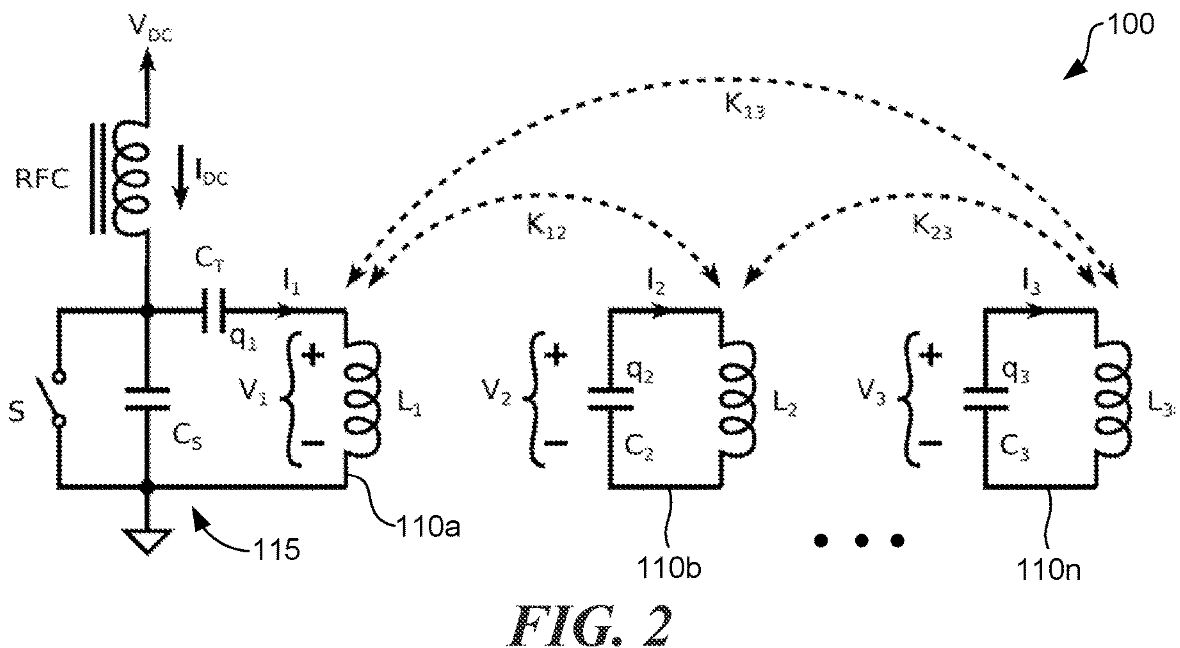
FIG. 2 is an example circuit diagram showing a Class-E amplifier driving a system having multiple coupled resonators according to various embodiments of the present disclosure.

A Driven System Of Coupled Resonators. FIG. 2 is another example of a wireless power transfer system 100 according to various embodiments. The wireless power transfer system 100 of FIG. 2 includes an amplifier 115, which may include a Class-E amplifier in various embodiments. Further, the wireless power transfer system 100 includes multiple coupled resonators 110. As such, in embodiments in which the amplifier 115 is a Class-E amplifier, the Class-E amplifier may drive a system of coupled resonators 110.

Considering the wireless power transfer system 100 shown in FIG. 2, a first resonator 110*a* is part of a tank circuit of the amplifier 115 (e.g., a Class-E amplifier) driven at an angular resonant frequency of a desired eigenmode, ω. Capacitor values for each of the resonators, $C_n$, are still given by Eq. 11, except for the capacitance of the first resonator 110*a*, $C_T$, which must be chosen in order to satisfy Eqs. 41 and 43 below.

The total reactance of the tank circuit inductor, $L_1$, is given by:

$$X_{L_1} = \frac{\sum_{m=1}^{N} \omega M_{1m} I_m}{I_1}. \quad \text{(eq. 22)}$$

where the effect of the flux induced by the other resonators has been taken into account.

Eq. 22 may also be written in terms of the coupling matrix, K, and the resonator amplitude vector, a:

$$X_{L_1} = \frac{\sum_{m=1}^{N} \omega M_{1m} I_m}{I_1} = \omega L_1 \frac{\sum_{m=1}^{N} \sqrt{L_m} K_{1m} I_m}{\sqrt{L_1} I_1} = \omega L_1 \sum_{m=1}^{N} K_{1m} \frac{a_m}{a_1} = \epsilon_1 \omega L_1. \quad \text{(eq. 23)}$$

where $\epsilon_1$ is defined by Eq. 21. Define the constant, k, to be:

$$k \equiv \frac{x_s}{x_s + x_{C_T}}. \quad \text{(eq. 24)}$$

If the tank circuit is tuned such that Eq. 50 is satisfied, then:

$$X_T = \varepsilon x_s = X_{L_1} - X_{C_T} = X_{L_1} - \frac{1-k}{k} x_s. \quad \text{(eq. 25)}$$

If a desired value of k is chosen, then Eqs. 24 and 25 may be solved to give the following solutions for $\chi_s$ and $\chi_{C_T}$:

$$x_s = \frac{k}{1 - k(1-\varepsilon)} X_{L_1}. \quad \text{(eq. 26)}$$

$$x_{C_T} = \frac{1-k}{1 - k(1-\varepsilon)} X_{L_1}. \quad \text{(eq. 27)}$$

If $\chi_{L1}$ is known, and a desired value of $\chi_s$ is chosen, then Eq. 26 may be solved fork:

$$k = \frac{1}{1 - \varepsilon + \frac{X_{L_1}}{x_s}}, \quad \text{(eq. 28)}$$

and Eq. 25 may be solved to give $\chi_{C_T}$:

$$x_{C_T} = x_{L_1} - \varepsilon x_s. \quad \text{(eq. 29)}$$

Once the value of $\chi_s$ is known, the DC supply voltage may be determined using Eq. 30:

$$I_1 = \frac{\pi V_{DC}}{x_s} \cdot \frac{1}{\sin(\pi d) + \pi(1-\delta)\cos(\pi d)}, \quad \text{(eq. 30)}$$

where $I_1$ is the desired current amplitude in the driven resonator.

The resonant angular frequency of the tank circuit, $\omega_1$, when it is decoupled from the other resonators, is given by:

$$\frac{\omega_1^2}{\omega^2} = \frac{1}{\omega^2 L_1 C_T} = \frac{1}{\omega C_T} \cdot \frac{1}{\omega L_1} = \epsilon_1 \frac{x_{C_T}}{x_{L_1}} = \epsilon_1 \frac{1-k}{1-k(1-\varepsilon)} \quad \text{(eq. 31)}$$

$$\frac{\omega_1^2}{\omega^2} = \sqrt{\epsilon_1}\sqrt{\frac{1-k}{1-k(1-\varepsilon)}}. \quad \text{(eq. 32)}$$

Note that if k<<1, then Eq. 32 may be approximated by:

$$\frac{\omega_1}{\omega} \approx \sqrt{\epsilon_1}\left(1 - \frac{\varepsilon k}{2} + \vartheta\left[k^2\right]\right). \quad \text{(eq. 33)}$$

Figure 3:
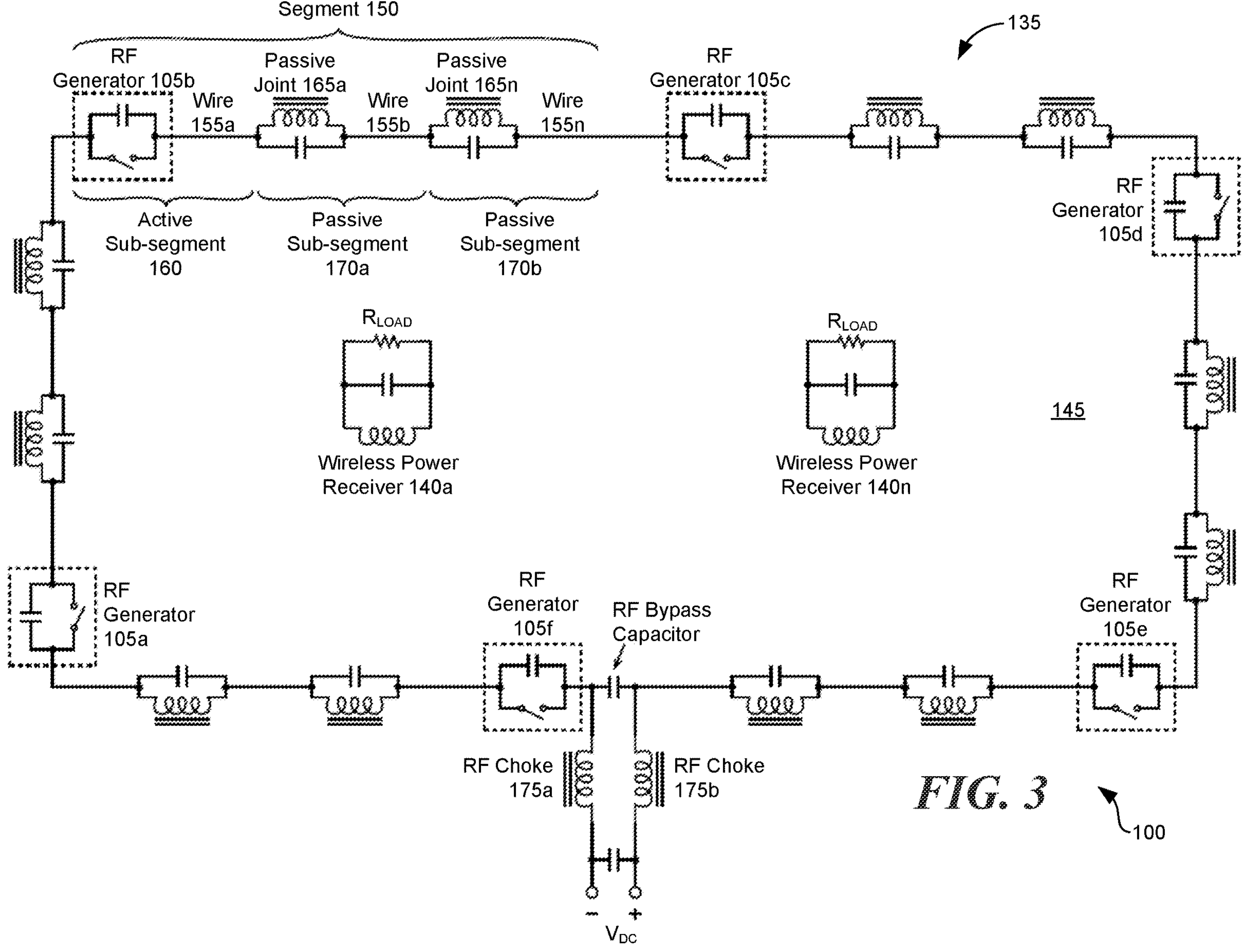
FIG. 3 is an example circuit diagram showing a distributed Class-E RF generator driving a magnetic loop antenna and powering resonant receivers according to various embodiments of the present disclosure.

Distributed RF Generator. The embodiments described above describe how to drive a resonant loop in a wireless power transfer system 100 with a basic Class-E amplifier. However, in accordance with various embodiments described herein, it is also possible to drive a resonant loop with a distributed RF generator, like that depicted in FIG. 3. Specifically, FIG. 3 is an example of a wireless power transfer system 100 having a distributed Class-E RF generator driving a magnetic loop antenna having a conductive loop (hereinafter "loop 135"), and powering resonant wireless power receivers 140*a* . . . 140*b* (collectively "wireless power receivers 140") located in a wireless power transfer area 145. The distributed Class-E RF generator comprises multiple RF generators 105*a* . . . 105*n* (collectively "RF generators 105").

A distributed RF generator may be formed of multiple segments, such as representative segment 150. Each segment 150 may include at least one RF generator 105 (e.g., RF generator 105*b*) and a length of wire 155*a* thereby forming an active sub-segment 160. Each segment 150 may also contain a number of passive joints 165*a* . . . 165*n* (collectively "passive joints 165") connected to lengths of wire 155*b* . . . 155*n*, thereby forming passive sub-segments 170*a*, 170*b*. A passive joint 165 may include of a parallel combination of a capacitor C and an RF choke 175*a*, 175*b*, for example. The RF choke 175 is chosen to have an impedance much higher than the impedance of the capacitor C at the drive frequency of the RF generator 105.

The entirety of the loop 135 forms a resonant tank circuit. The effective series capacitance, $C_T$, of the resonant tank circuit is equal to the total series capacitance of all of the passive joints in the loop 135. Each Class-E RF generator 105 may comprise a switching element (e.g., a MOSFET transistor) in parallel with a switch capacitor along with additional circuitry to control the switching element and lock the phase of its switching waveform to that of all the other RF generators 105. The effective switch capacitance, $C_S$, is equal to the total series capacitance of all of the switch capacitors in the loop.

Due to the RF chokes 175 being in parallel with the capacitors in the passive joints 165, the entire loop is capable of supporting a DC current. A DC voltage and current are injected at one point of the loop 135 which provides DC power to all of the distributed RF generators 105. The RF generators 105 take in DC power from their terminals, and output RF power from the same pair of terminals. This allows all of the RF generators 105 to receive DC power through the loop itself without requiring additional wiring.

In further embodiments, phase-locking may be performed without any additional wiring by locking an internal oscillator (not shown) within each RF generator 105 to the phase of the RF current circulating around the loop 135. This ensures that all of the RF generators 105 are in phase with each other without requiring any additional wiring other than the wire of the loop 135 itself.

All of the foregoing analysis may be applied to the distributed Class-E RF generator, as long as $C_S$ is taken to be the total series switch capacitance, $C_T$ is taken to be the total series capacitance of all of the passive joints 165, and VDC is taken to be the total DC voltage applied to the loop 135.

Figure 5:
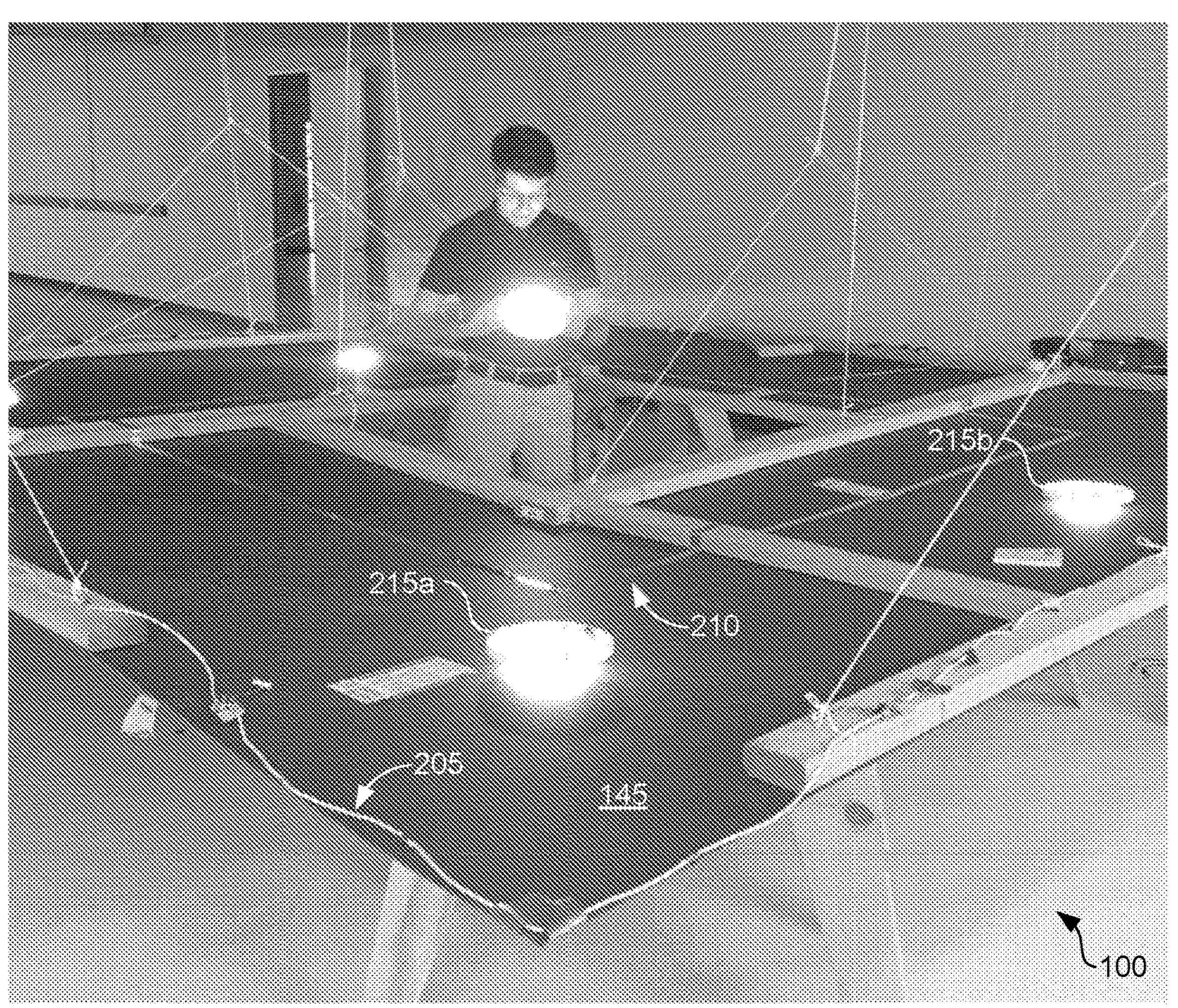
FIG. 5 is a photograph of a 12 ft×12 ft double resonator system powering five regulated, 5 W light emitting diode loads, where an outer loop is actively driven by a distributed Class-E amplifier and the inner loop is a passive resonator according to various embodiments of the present disclosure.
Figure 6:
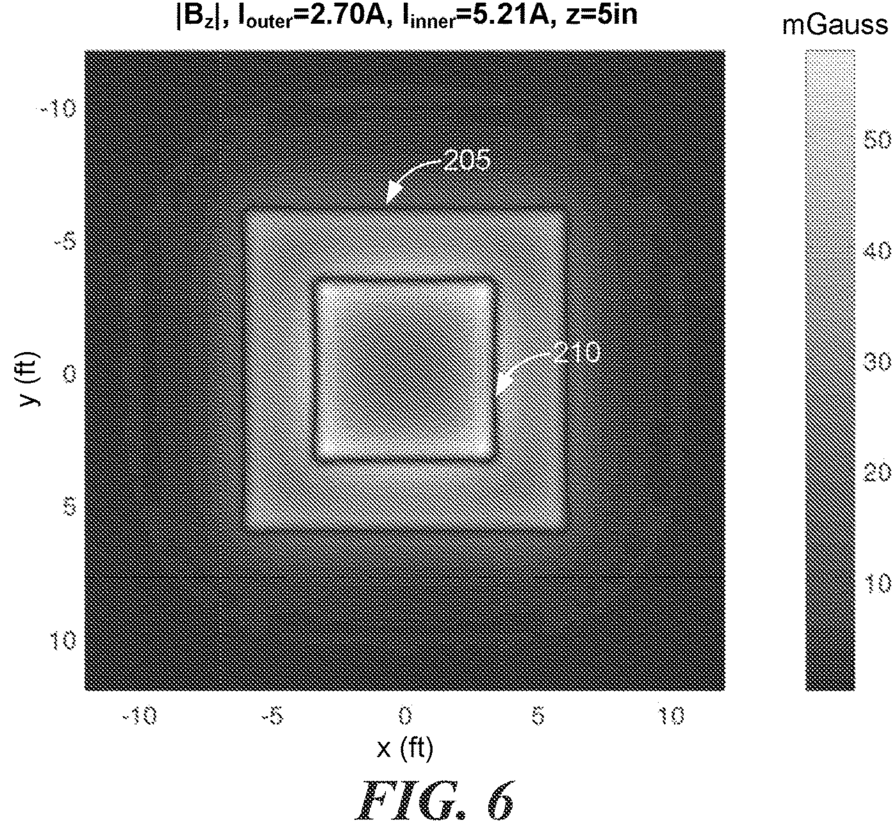
FIG. 6 is a simulation of a magnitude of a vertical component of a magnetic field of the double resonator, at a height of 5 inches above the plane of the loops according to various embodiments of the present disclosure.
Figure 7:
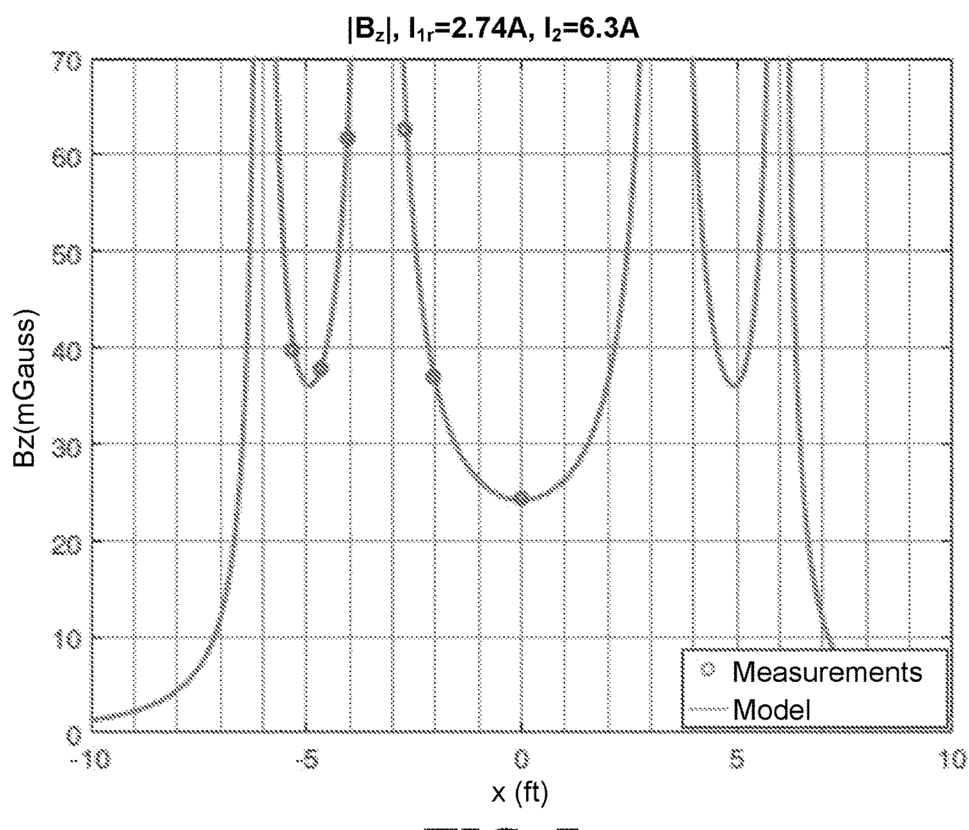
FIG. 7 is a chart showing a cross-section of a simulated field pattern of the double resonator system of FIG. 4 according to various embodiments of the present disclosure.

Double Resonator. The simplest application of Eqs. 20 and 33 are to the case of two coupled resonators 110 in which one is driven and one is passive. An example of a wireless power transfer system 100 is shown in FIGS. 5 and 6. FIG. 5 is a photograph of a 12 ft×12 ft (3.68 m×3.68 m) double resonator wirelessly powering five regulated 5 W light-emitting diode (LED) loads 215*a* . . . 215*e* located in a wireless power transfer area 145. The wireless power transfer system 100 includes an outer loop 205 that is actively driven by a distributed Class-E amplifier and an inner loop 210 that is a passive resonator. FIG. 6 shows a simulation of the magnitude of the vertical component of the magnetic field of the double resonator, at a height of 5 inches (0.127 m) above the plane of the loops. The wireless power transfer system 100 shown comprises of a 12 ft (3.68 m) actively driven square loop (e.g. outer loop 205) which encloses a 6.75 ft (2.06 m) passive square loop (e.g., inner loop 210).

The double loop structure has several advantages over a simple 12 ft (3.68 m) square loop. First, the inner loop 210 enhances the field strength at the center of the structure without requiring a corresponding increase in the RF current in the outer loop 205. This allows a certain minimum field strength to be maintained everywhere in the interior of the outer loop 205 at a lower RF power level than if the inner loop 210 were absent. Second, if the current direction in the inner loop 210 is chosen to be opposite that of the outer loop 205, the ratio of the two currents may be chosen such that the entire structure has zero net dipole moment, which can help suppress far-field radiation.

Third, if lossy conductive objects are present in the environment (e.g., in the wireless power transfer area 145), the ratio of the inner to outer current may be chosen to minimize the magnetic field in their vicinity, reducing the net loss of the system. For example, the current ratio shown in FIG. 5 was chosen to minimize the loss in a conductive plane located 5 ft (1.52 m) below the plane of the two loops 205, 210. Fourth, if the passive loop (e.g., the inner loop 210) follows the driven loop very closely, such that they are tightly coupled, the passive loop (e.g., the inner loop 210) will not affect the shape of the magnetic field; however, it can affect the strength of the field. The eigenmode may be designed such that the passive loop (e.g., the inner loop 210) carries more current than the actively driven loop (e.g., the outer loop 205), thereby amplifying the magnetic field of the wireless power transfer system 100. This may be used to perform impedance matching between the resonator 110 and the RF generators 105 connected to the driven loop (e.g., the outer loop 205).

Figure 4:
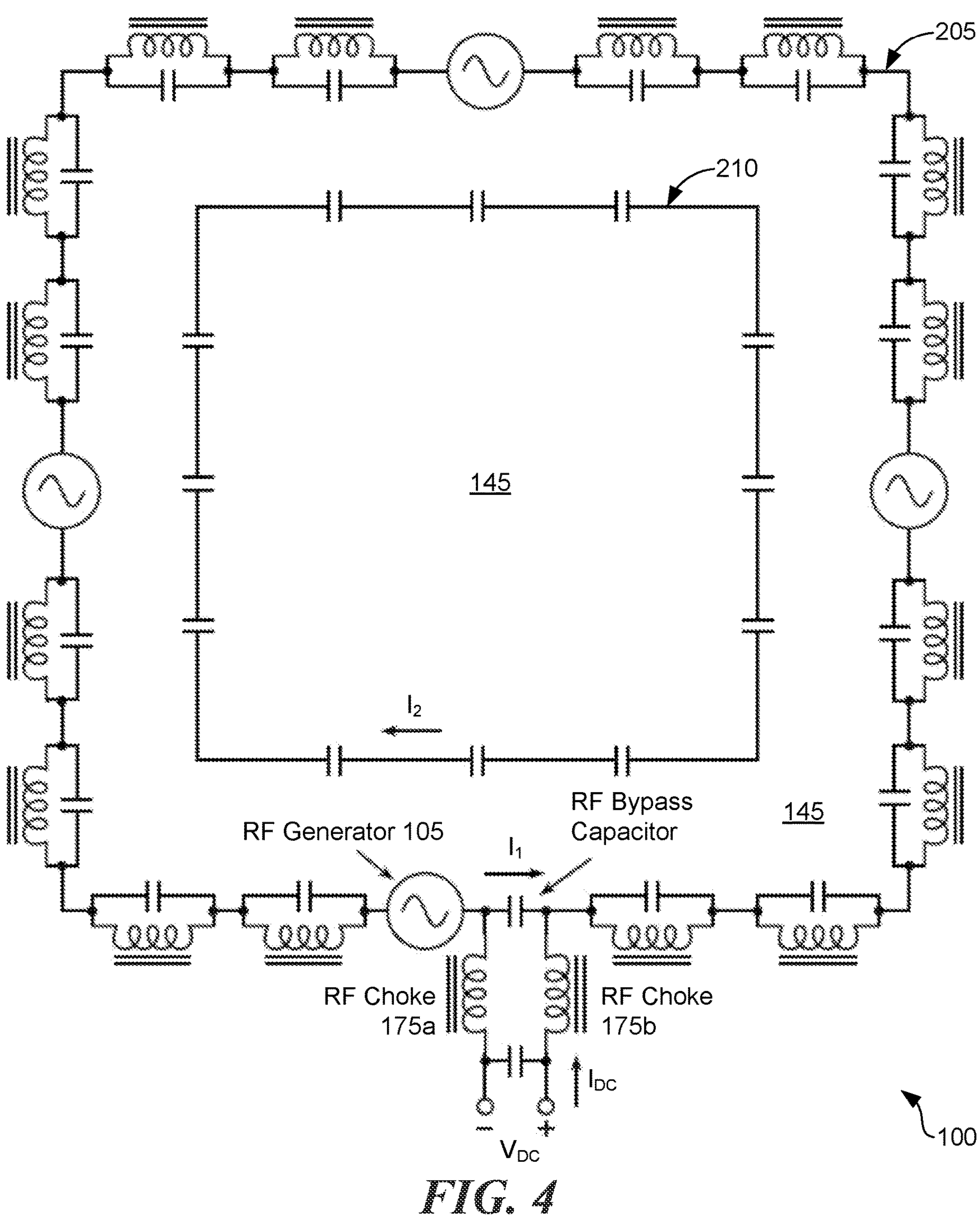
FIG. 4 is an example circuit diagram showing a double resonator system comprising two square loops according to various embodiments of the present disclosure.
Figure 8:
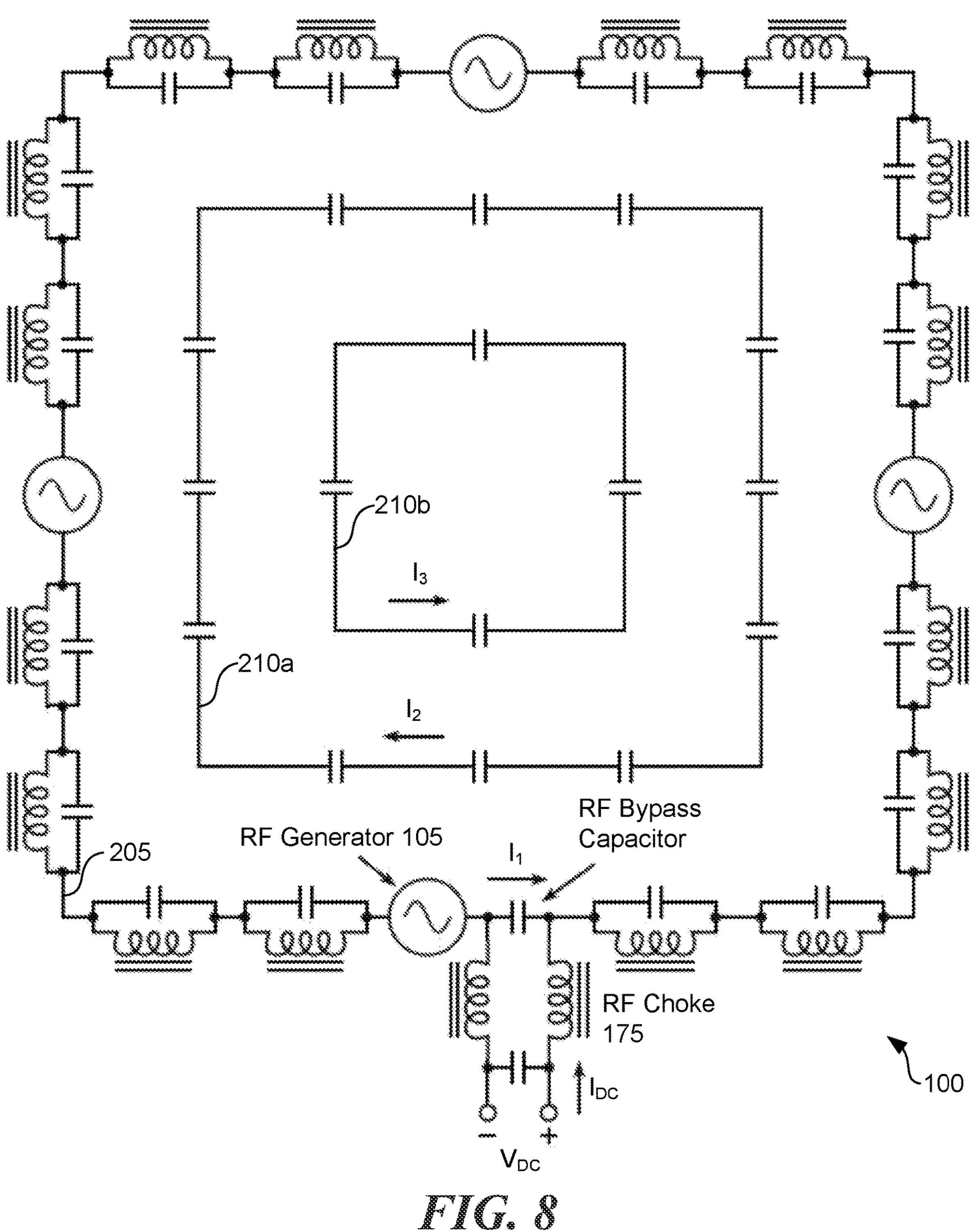
FIG. 8 is an example circuit diagram of a triple nested resonator system according to various embodiments of the present disclosure.

Multiple Nested or Stacked Resonators. FIG. 4 is a schematic of a double resonator wireless power transfer system 100 comprising two square-shaped loops 205, 210. The outer loop 205 is actively driven with a distributed RF generator 105. The inner loop 210 is a passive resonator. The RF current amplitudes of the outer loop 205 and the inner loop 210 are $I_1$ and $I_2$, respectively. The nested loop arrangement shown in FIG. 4 may also be extended three or more loops as may be appreciated. FIG. 8, for example, shows a wireless power transfer system 100 comprising three nested loops. Additional nested loops allow greater control over the shape of the magnetic field, as may be appreciated.

Figures 9, 10:
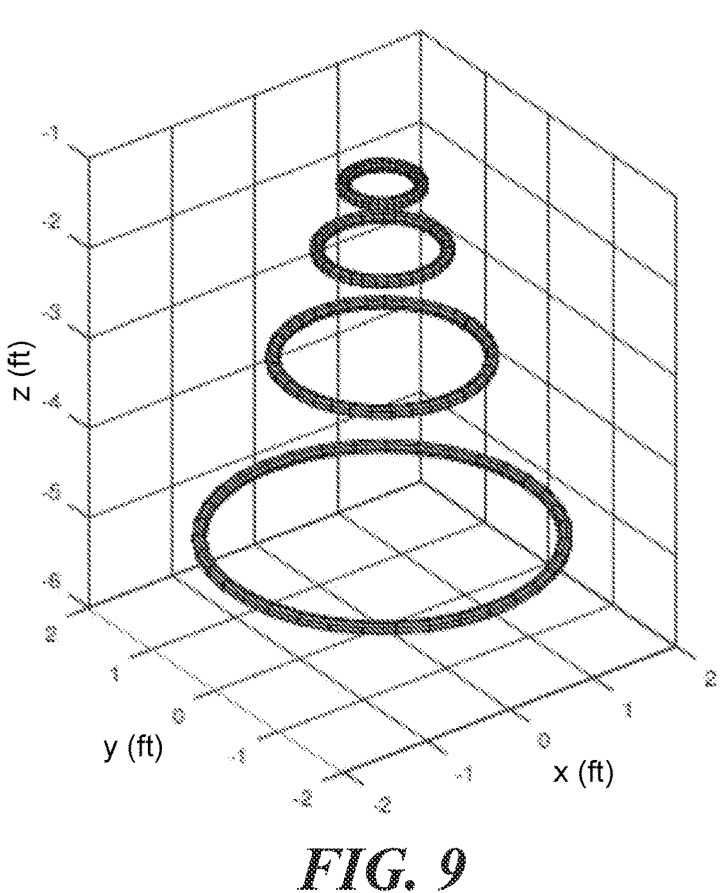
FIG. 9 is a plot of four stacked, coupled, resonant loops arranged in a conical shape according to various embodiments of the present disclosure.
FIG. 10 is a schematic of a 4×4 array of tiled resonators according to various embodiments.

For example, if their current magnitudes are equal, but alternating in direction, a wireless power transfer system 100 comprising a large number of such nested loops will have roughly equal field strength in the center of the gap between each adjacent pair of loops, independent of the radius. This is in contrast to the field of a simple loop, where the field at the center may be much lower than the field near the edge of the loop. Note that the resonators need not be co-planar. They may be stacked to create a magnetic field filling the volume of a cone, a cylinder, or any arbitrary three-dimensional region. For example, FIG. 9 shows a plot of four coupled resonators arranged in a conical shape. Any one of the resonators could be chosen as the driven resonator. It is also possible to drive multiple resonators in the coupled resonator system so long as the RF power sources are phase-locked. This phase-locking may be accomplished by manner of a shared local oscillator, injection-locking, or by various other mechanisms.

Figure 11:
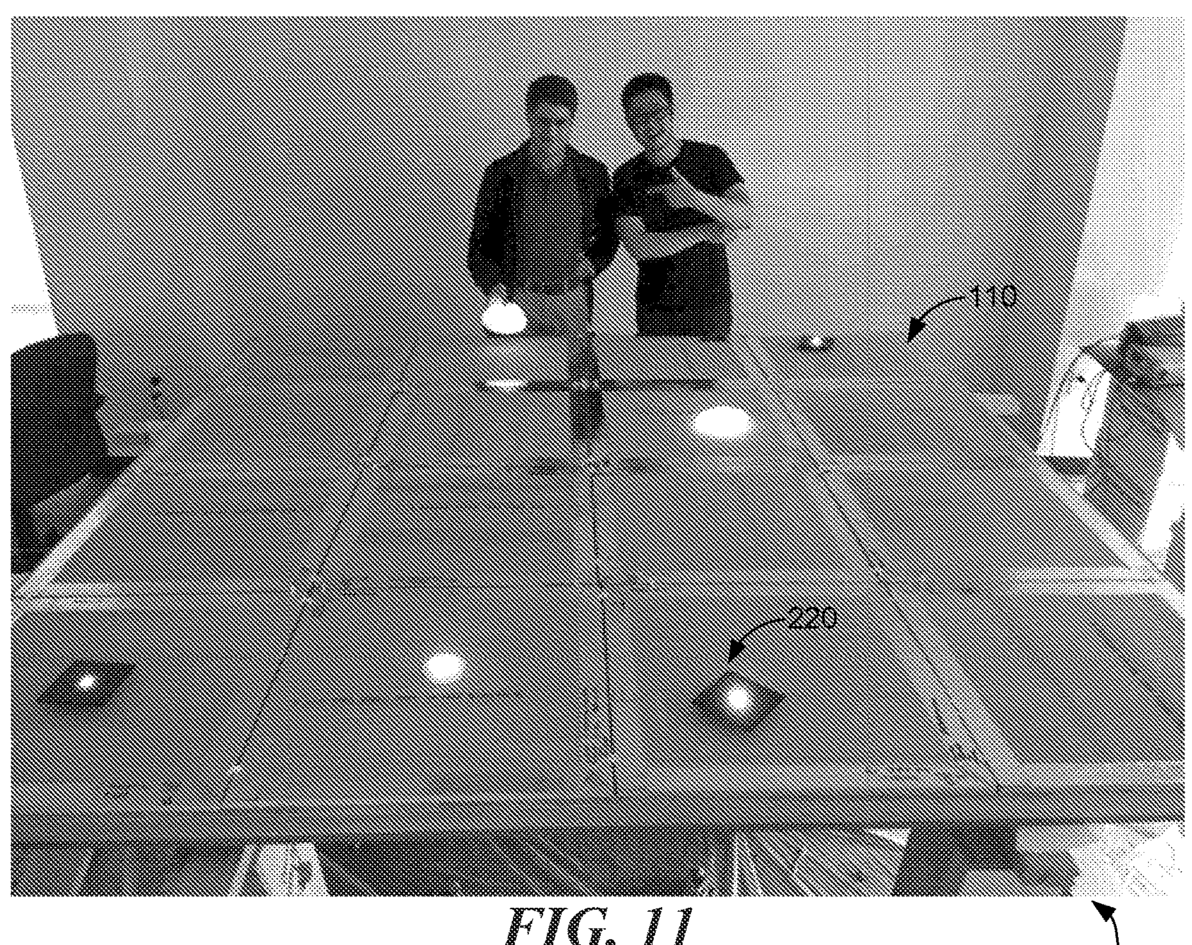
FIG. 11 is a photograph of a 4×4 array of tiled resonators powering six low-power (<1 W) light emitting diode loads, where the entire structure is 8 ft×8 ft in size, all tiles are passive except for one tile on the edge which is actively driven according to various embodiments of the present disclosure.

Resonator Arrays. FIG. 11 shows another application of Eqs. 20 and 33, this time applied to an array of identical resonators. Specifically, a wireless power transfer system 100 includes an array of resonators 110 having an identical size and shape. The array consists of square resonators 110 arranged in a square grid, with a very small gap between resonators 110. The small gap ensures coupling between nearest-neighbors is maximized, and is much larger than the coupling between next-nearest-neighbors.

If receiver devices 200 are designed to be attached to the surface of the array of resonators 110, then efficiency of the wireless power transfer system 100 is improved assuming the magnetic field of the array does not extend too far from the plane. This may be achieved by alternating the direction of current circulation between each resonator 110 and its nearest-neighbor. At distances large compared to the resonator size, the fields tend to cancel, which ensures the magnetic energy density is confined close to the plane. If it is desirable for devices to receive the same level of power regardless of how they are positioned within the array, then the current amplitudes of all the resonators 110 are hoped to be equal in magnitude.

The fact that the coupling is dominated by the nearest neighbors in the array allows the following simplification to be made. Let K denote the coupling between nearest neighbors. Let $|\alpha_n|$ be the same for all resonators. Eq. 20 may be rewritten as:

$$\frac{\omega_n}{\omega} = \sqrt{\sum_{m=1}^{N} K_{nm}\frac{a_m}{a_n}} \approx \sqrt{1+|K|N_n}, \quad \text{(eq. 34)}$$

where $N_n$ is the number of nearest neighbors adjacent to the nth resonator.

It can be seen from Eq. 34 that the frequencies of the resonators 110 on the edges and corners of the array must differ from the frequency of the resonators 110 on the interior of the array in order for the array to have an eigenmode with a uniform current amplitude in all resonators.

Self-Tuning Resonators. The resonators in a wireless power transfer system 100 shown in FIG. 10 and FIG. 11 all have fixed tuning. Therefore, different resonators 110 are needed based on their position within the array. However, it is desirable to build an array with a uniform eigenmode from identical resonators 110. This may be achieved if each resonator's intrinsic frequency is re-tuned based on the presence or absence of its nearest neighbors. In order to see how this may be accomplished, Eq. 12 may be rewritten as:

$$\frac{1}{\omega C_n} = \omega L_n + \sum_{m\neq n}\omega M_{nm}\frac{I_m}{I_n}, \quad \text{(eq. 35)}$$

where the sum is taken over all values of m not equal to n.

In the case of an array with a uniform eigenmode, it may be stipulated that:

$$\frac{I_m}{I_n} = -1 \text{ and } M_{nm} = M \quad \text{(eq. 36)}$$

for two resonators 110, n and m, which are nearest-neighbors (assuming the definition of current directions as shown in FIG. 10). It may be assumed that the mutual inductance is negligible for any two resonators which are not nearest neighbors. For any pair of non-overlapping co-planar resonators, M is negative. Eq. 35 therefore may be rewritten as:

$$\frac{1}{\omega C_n} = \omega L_n + \omega|M|N_n = \omega L_n + \frac{N_n}{\omega C_r} \quad \text{(eq. 37)}$$

$$\omega L_n = \frac{1}{\omega C_n} - \omega|M|N_n = \frac{1}{\omega C_n} - \omega L_r N_n \quad \text{(eq. 38)}$$

where, as before, $N_n$ denotes the number of nearest neighbors adjacent to the nth resonator, and where the quantities, $C_r$ and $L_r$ are defined as:

$$C_r \equiv \frac{1}{\omega|M|},\ L_r \equiv |M|. \quad \text{(eq. 39)}$$

Figure 12:
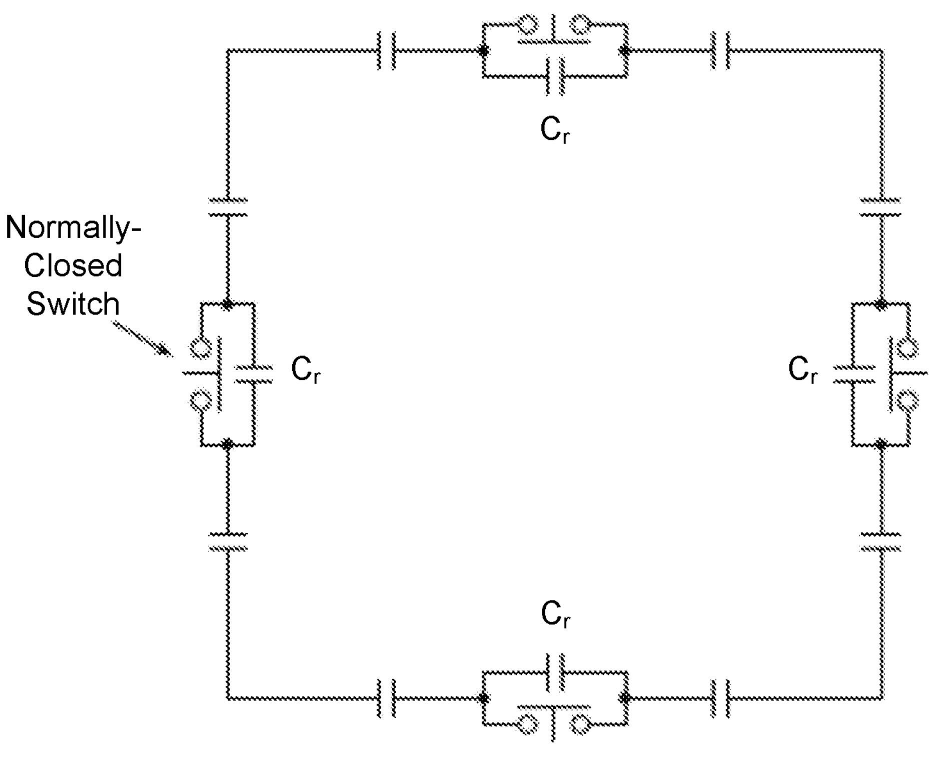
FIG. 12 is an example circuit diagram showing a self-tuning resonator using switched capacitors according to various embodiments.

As seen from Eq. 37, the proper tuning of the nth resonator may be achieved by holding $L_n$ fixed, and adding a series capacitor, with a capacitance of $C_r$, to the resonator for each nearest neighbor. An example of how this may be implemented is shown in schematic form in FIG. 12. Specifically, FIG. 12 shows a self-tuning resonator using switched capacitors. Four capacitors, with capacitance $C_r$ are placed in series with the resonator on each of the four sides. Each capacitor is normally shorted by a switch. The switch is opened when another resonator is placed adjacent to that side. The switches may be implemented using mechanical pushbutton switches, magnetic reed switches, electrically-controlled MOSFET switches, etc.

Figure 13:
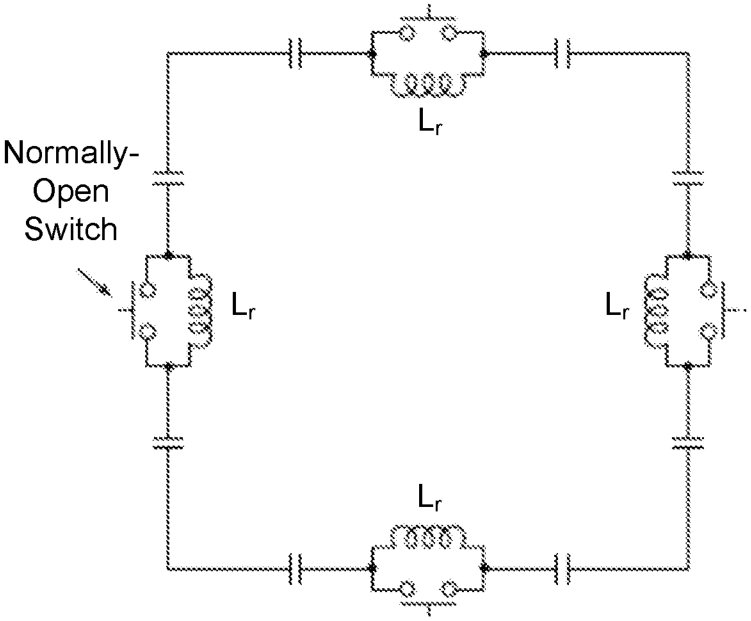
FIG. 13 is an example circuit diagram showing a self-tuning resonator using switched inductors according to various embodiments.
Figure 14:
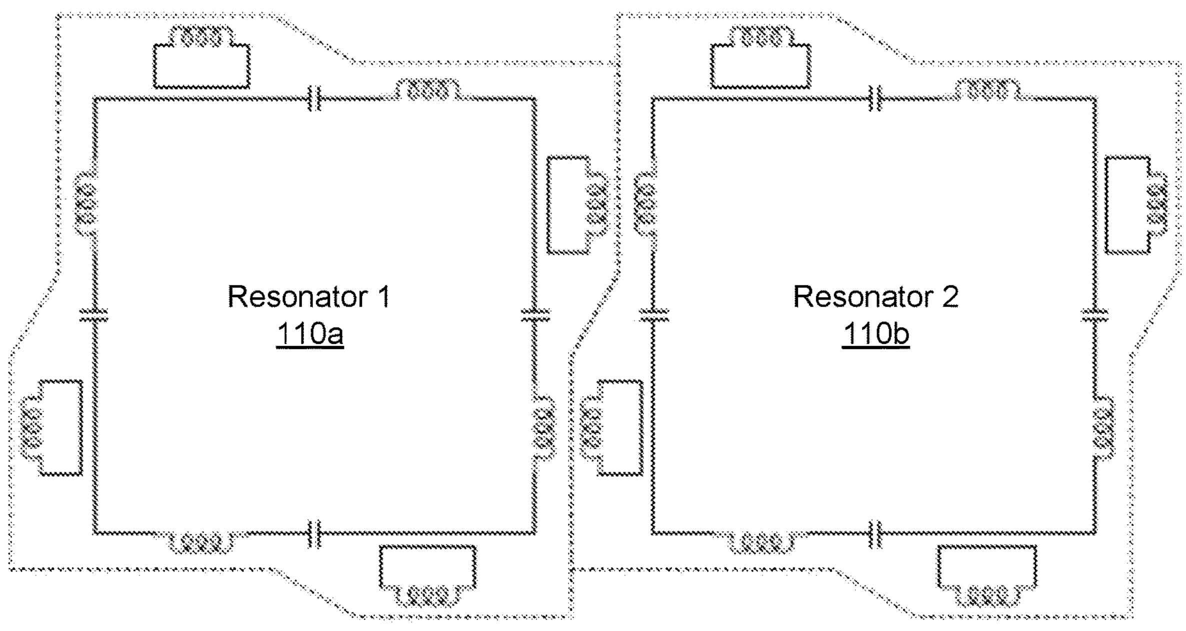
FIG. 14 is an example circuit diagram showing an equivalent circuit of a self-tuning resonator using proximity re-tuning according to various embodiments.

Alternatively, Eq. 38 shows that the proper tuning of the nth resonator may be achieved by holding $C_n$ fixed, and subtracting a series inductor, with an inductance of Lr, from the resonator for each nearest neighbor. Two examples of how this may be implemented are shown in FIGS. 13 and 14. FIG. 13 shows an example of self-tuning resonator 110 using switched inductors. Four inductors, with inductance Lr are placed in series with the resonator on each of the four sides. Each inductor is shorted by a switch when another resonator is placed adjacent to that side. The switches may be implemented using mechanical push button switches, magnetic reed switches, electrically-controlled MOSFET switches, etc.

FIG. 14 is an example of an equivalent circuit of a self-tuning resonator using proximity retuning. Four inductances are placed in series with the resonator on each of the four sides. These inductances are designed to have stray fields which overlap with a conducting structure on the adjacent loop. When the adjacent loop is present, the conducting structure behaves electrically like a shorted transformer secondary. This results in a reduction of the series inductance of each side whenever a resonator is adjacent to that side. If the reduction in the inductance is designed to be equal to Lr, then Eq. 38 is satisfied.

Figure 15:
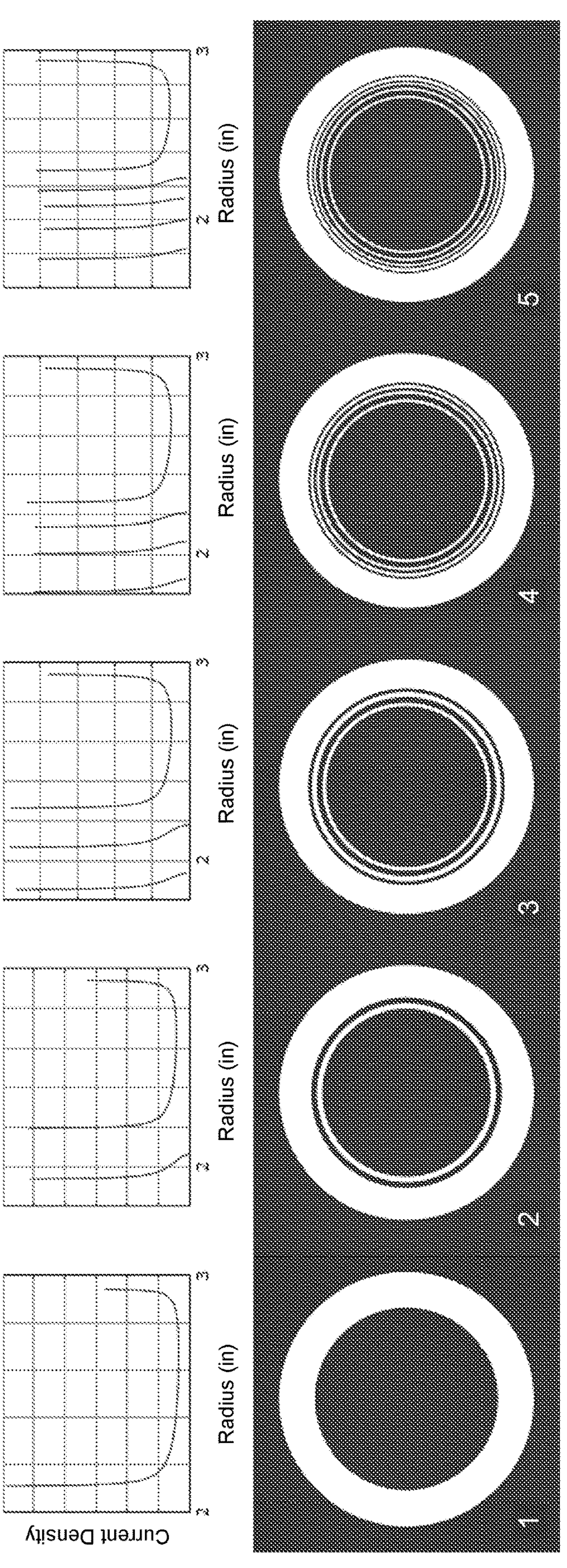
FIG. 15 is various resonator designs with varying geometry of two-dimensional annular receive resonators shown relative to current density and radius according to various embodiments of the present disclosure.
Figure 16:
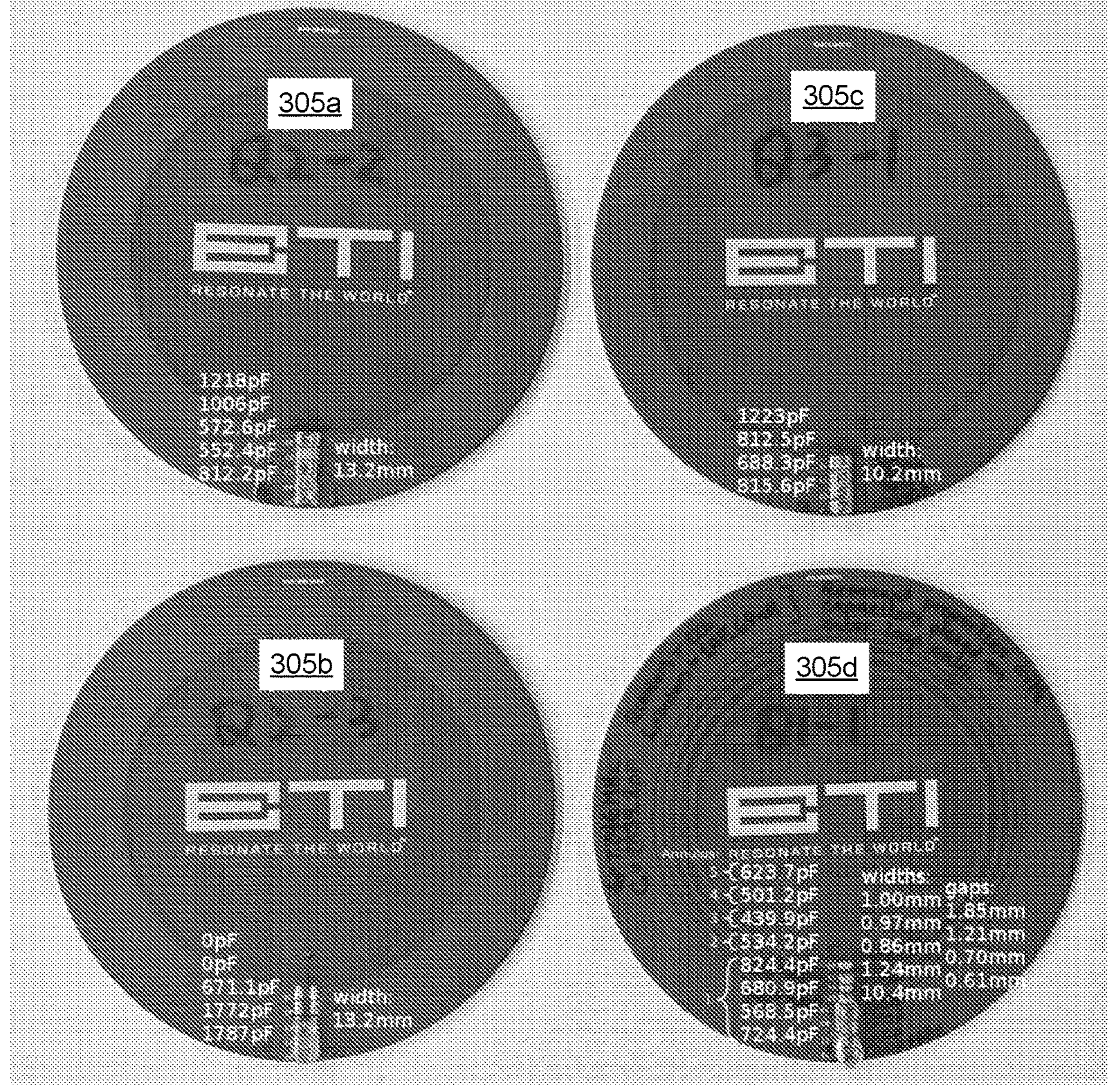
FIG. 16 is a photograph of various resonator designs according to various embodiments of the present disclosure.

Annular Receiver Resonators. A system of coupled resonators can also be used as a receiver of wireless power. FIGS. 15 and 16 show two-dimensional annular receivers consisting of multiple coupled, resonant loops. Using Eq. 20, the system of coupled loops may be designed to have an eigenmode with a desired current distribution, and with an eigenfrequency equal to the angular frequency of the ambient magnetic field. The widths, gaps, and current carried by each annulus may be varied to optimize the power absorbed by the resonant system from the ambient field. FIG. 15 shows the result of a simulation to determine the optimal trace widths and gaps for annular resonators, assuming a fixed outer diameter, as a function of the number of annuli. It was found that adding more annuli increases the total power which may be received, all else being equal. For example the five-annulus receiver (bottom right in FIG. 16) was found to have a capture volume 7% higher than that of the single-annulus receiver (top left in FIG. 16). The capture volume was calculated by taking the product of the experimentally measured quality factor and the theoretical dipole volume, v, of each resonator, where the dipole volume is defined by the equation:

$$v \equiv \frac{\mu m^2}{\varepsilon}, \qquad \text{(eq. 40)}$$

where m is the magnetic dipole moment of the receiver, ε is the stored electromagnetic energy of the receiver, and μ is the permeability of the surrounding medium.

The optimal geometry tends to consist of one wide outer annulus plus multiple narrow inner annuli. In most cases, the width of the outer annulus was much wider than the width of the typical surface-mount ceramic capacitors which were used to tune the resonators. Therefore, multiple capacitors may fit in parallel across the gap between conductors. This raises the question of how to distribute the capacitor(s) across this gap.

The plots on the top level of FIG. 15 show the cross section of the current density flowing through the annular conductors. In principle, the best performance would be expected if the distribution of current through the capacitors matches this theoretical current distribution. This was found to be true experimentally. The top left and bottom left resonators in FIG. 16 single-annulus resonators, and are identical except for the placement of the capacitors. A 20% reduction was found in the quality factor of the resonator when all of the capacitance was concentrated on the edge, versus the case where the capacitor values were chosen to give a current distribution closely matching the theoretical current density profile.

The optimization steps are: 1) Choose the outer diameter. 2) Choose the number of annuli. 3) Find the optimal gap and trace widths. 4) Determine if each trace width is larger than the capacitor width.

If the trace width is larger than the capacitor width, then: 1) Choose the placement of capacitors. 2) Determine the total capacitance needed. 3) Determine what fraction of the current will flow through each capacitor based on the geometry and the simulated current density profile. 4) Assign each capacitor a capacitance equal to the total capacitance multiplied by the fraction of current which it will carry. Note that in some cases, multiple series gaps may need to be placed in the annular resonators to allow impedance matching to a load. In those cases, the distribution of capacitance in each gap should be chosen according to the steps above.

Eqs. 20 and 33 were found for the frequencies of passive and active resonators, respectively, within a system of coupled resonators. These equations guarantee the existence of an eigenmode with an eigenfrequency equal to the desired angular drive frequency, w. The ratio of current amplitudes in the resonant eigenmode may be freely chosen in order to create a resulting magnetic field pattern with certain desirable properties. Two different systems of coupled resonators were constructed, demonstrating how these equations may be put to practical use.

Figure 17:
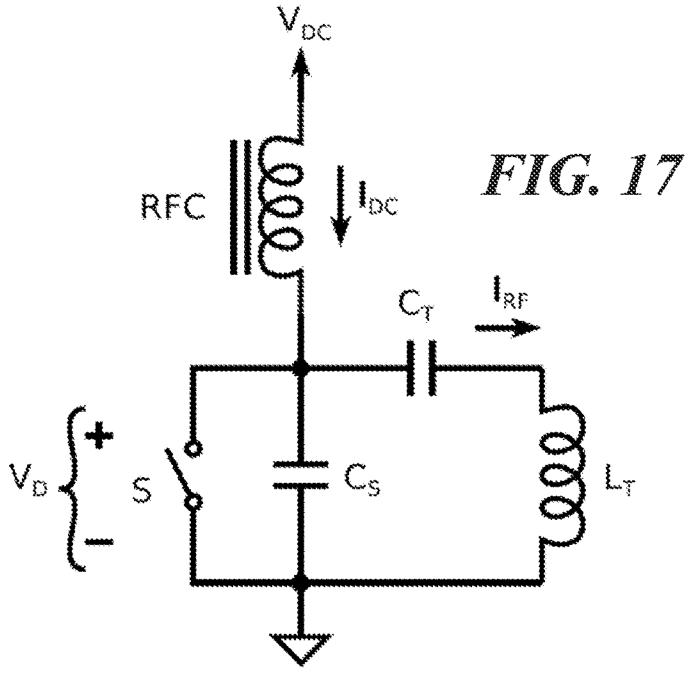
FIG. 17 is an example circuit diagram showing a Class-E amplifier according to various embodiments of the present disclosure.

Class-E Amplifier Under Light Load. Consider the Class-E amplifier shown in FIG. 17. The amplifier takes in DC power from a DC voltage source, $V_{DC}$, through an RF choke, RFC. The DC current, $I_{DC}$, flows into a switch capacitor, $C_S$, in parallel with a switching element, S. The switching element, S, converts the DC power into RF power which drives an oscillating RF current, IRF, in the resonant tank circuit formed by $C_T$ and $L_T$.

Let it be assumed that the switching element, S, is switched on with duty cycle, δ, and period, T=2π/ω. Let it also be assumed that the amplifier is under light load, i.e. $I_{DC} \ll I_{RF}$, and that the switching element, S satisfies the zero-voltage switching (ZVS) condition, or in other words, the voltage, $V_D$, across the switching element, S, is zero at the time when the switch is turned on.

Figure 18:
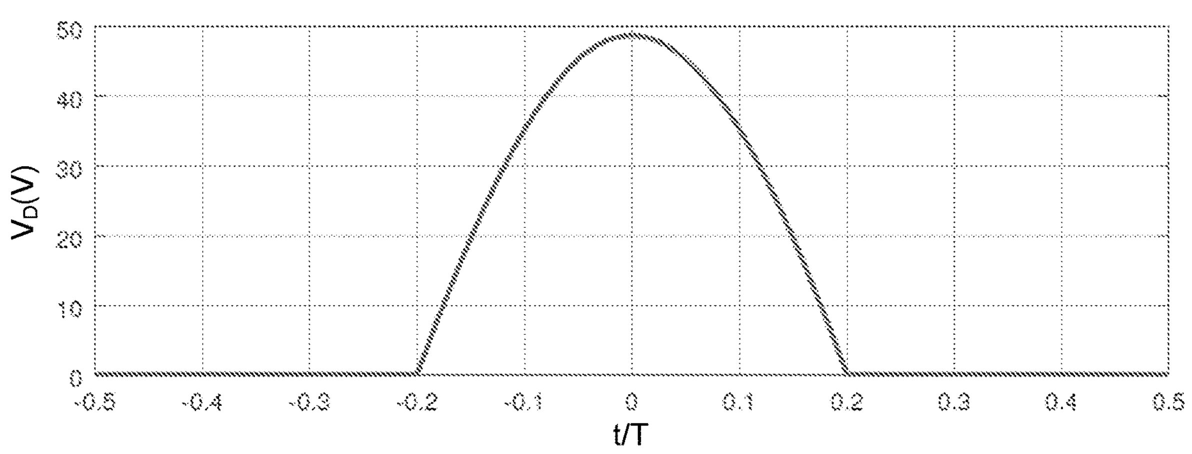
FIG. 18 includes charts depicting an example theoretical switch voltage waveform according to various embodiments of the present disclosure.
Figure 18:
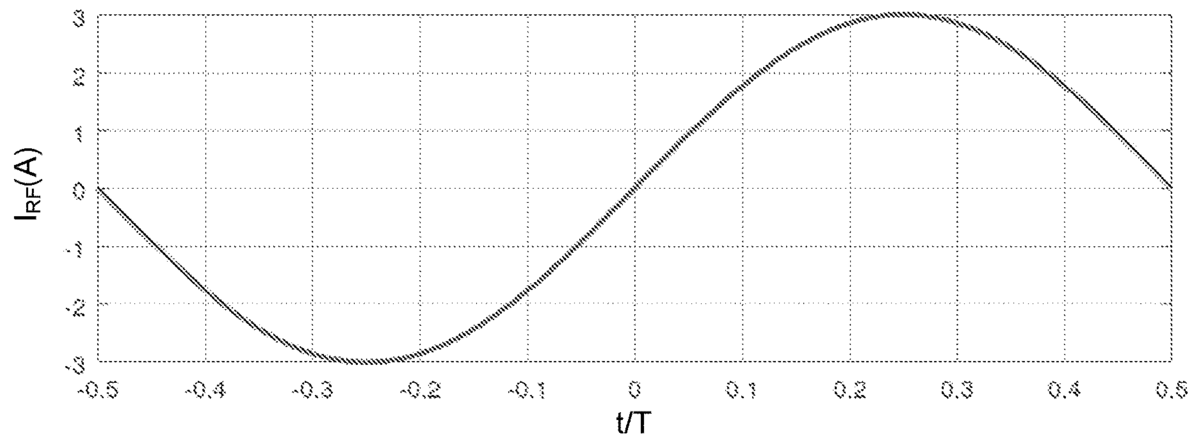

If the tank circuit is highly resonant, the RF current will very nearly approximate a sinusoid with angular frequency, ω:

$$I_{RF}(t) = I_{RF}\sin(\omega t), \qquad \text{(eq. 41)}$$

where $I_{RF}$ is the amplitude of the RF current. Under this assumption, and the assumption of light loading and ZVS, the switch voltage waveform may be approximated as:

$$V_D(t) = \begin{cases} x_s I_{RF}(\cos(\omega t) + \cos(\pi d)), & |\omega t| \le \pi(1-\delta) \\ 0, & |\omega t| > \pi(1-\delta) \end{cases}, \quad \text{(eq. 42)}$$

where $x_s=1/(\omega C_s)$ is the reactance of the switch capacitor, $C_S$. Example switch voltage and RF current waveforms are plotted in FIG. 18. Specifically, FIG. 18 depicts an example theoretical switch voltage waveform, VD(t), and RF current waveform, $I_{RF}(t)$, for $I_{RF}$=3A, $x_S$=23:5Ω, and δ=⅔.

The DC component of the switch waveform, VD, is:

$$\overline{V}_D = \frac{1}{T}\int_{-T/2}^{T/2} dt V_D(t) = x_s I_{RF}\left(\frac{\sin(\pi\delta)}{\pi} + (1-\delta)\cos(\pi\delta)\right). \quad \text{(eq. 43)}$$

Because the RF choke 175 presents zero impedance to DC current, the DC component of the switch waveform, $V_D$, must be equal to the DC supply voltage, $V_{DC}$:

$$x_s I_{RF}\left(\frac{\sin(\pi\delta)}{\pi} + (1-\delta)\cos(\pi\delta)\right) = V_{DC}. \quad \text{(eq. 44)}$$

Therefore, the amplitude of the RF current is given by:

$$I_{RF} = \frac{\pi V_{DC}}{x_s} \cdot \frac{1}{\sin(\pi\delta) + \pi(1-\delta)\cos(\pi\delta)}. \quad \text{(eq. 45)}$$

Note that the RF current amplitude depends only on the DC voltage, VDC, the reactance of the switch capacitor, $x_s$, and the duty cycle, δ. There exists an additional constraint on the RF current, namely, that the RF current must be equal to the RF component of the switch voltage waveform, $V_{RF}$, divided by the total series reactance of the tank circuit, $x_T$:

$$I_{RF} = \frac{V_{RF}}{x_T}, \quad \text{(eq. 46)}$$

where the total series reactance of the tank circuit, $x_T$, is defined to be:

$$x_T \equiv x_{L_T} - x_{C_T}, \quad \text{(eq. 47)}$$

and where the RF component of the switch voltage waveform, $V_{RF}$, is equal to:

$$V_{RF} = \frac{2}{T}\int_{-T/2}^{T/2} dt V_D \cos(\omega t) = x_s I_{RF}\left(\frac{\sin(2\pi\delta)}{2\pi} + 1 - \delta\right). \quad \text{(eq. 48)}$$

Equations 40 and 42 may be combined to give a relation between the tank circuit reactance, $x_T$, the switch capacitor reactance, $x_S$, and the duty cycle, δ:

$$\frac{x_T}{x_s} = \frac{\sin(2\pi\delta)}{2\pi} + 1 - \delta = \varepsilon, \quad \text{(eq. 49)}$$

where the dimensionless parameter, ε, is defined to be:

$$\varepsilon \equiv \frac{\sin(2\pi\delta)}{2\pi} + 1 - \delta, \quad \text{(eq. 50)}$$

For a given switch capacitor reactance, $x_S$, and a given total series tank circuit reactance, $x_T$, Eq. 43 may be used to solve for the duty cycle, δ, at which the ZVS constraint is satisfied.

Note that ε is always greater than zero and less than one for any duty cycle, 0<δ<1. Therefore, in order for a ZVS operating point to exist, the following condition must be satisfied:

$$0 < \frac{x_T}{x_s} < 1. \quad \text{(eq. 51)}$$

Condition 45 shows that the reactance of the tank circuit may vary over a range while allowing ZVS operation to be maintained, so long as δ is varied along with $x_T$ to ensure that Eq. 43 is always satisfied. If the duty cycle, δ, is automatically adjusted to maintain the ZVS condition, then the Class-E amplifier may be made robust against the effects of detuning due to variations in construction or environmental conditions.

In order to maximize the magnitude of the permissible error in $x_T$, ε may be designed to be equal to ½, which is the center of the ZVS range. This occurs at δ=½. However, if the error in $x_T$ tends to be biased in one direction or the other, a different design point for ε may be chosen to ensure the amplifier is able to accommodate the entire expected range of values of $x_T$.

Figure 19:
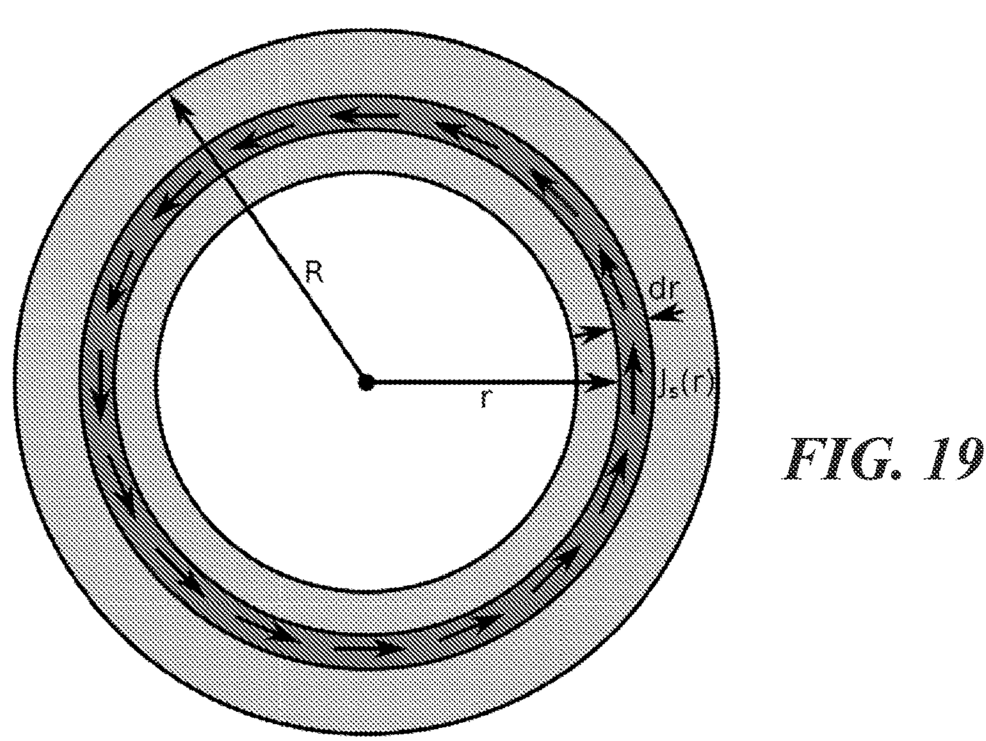
FIG. 19 is a diagram of an annular conductor having a tangential surface current density according to various embodiments of the present disclosure.

Optimization of Annular Receiver Resonators. FIG. 19 includes a diagram of an annular conductor with tangential surface current density, $J_s(r)$. For numerical simulation, each annulus may be broken into a set of current rings, separated by a distance, dr, with each ring carrying a current equal to $J_s(r)dr$. In order to simplify the problem and reduce the number of degrees of freedom, the space of resonators under investigation may be limited only to rotationally-symmetric, single-layer, two-dimensional structures, like that shown in FIG. 19.

The current distribution was represented as a tangential surface current density, Js(r), which was a function of the radius, r. The current distribution was assumed to be constrained to the disk r<R, where R is the outer radius of the resonator. This distribution of current creates a magnetic dipole moment, m, and contains a certain amount of stored inductive energy, E. The dipole volume, of this current distribution is defined by the equation: [3]

[EQ. 1]

where is the permeability of the surrounding medium. In a uniform, oscillating, ambient field, the maximum power that can be received by a dipole resonator is proportional to the capture volume, Ψ, defined by:

$$\Psi = Qv, \quad \text{(eq. 52)}$$

where Q is the quality factor of the resonator, which was calculated using the formula:

$$\frac{1}{Q} = \frac{1}{Q_c} + \frac{1}{Q_L}, \quad \text{(eq. 53)}$$

where $Q_C$ is the quality factor of the capacitance, and $Q_L$ is the quality factor of the inductance. $Q_C$ may be assumed to be a constant, independent of the shape or size of the annular resonator. $Q_L$ may be calculated using the formula:

$$Q_L = \frac{\omega \xi}{P_{diss}}, \quad \text{(eq. 53)}$$

where $P_{diss}$ is the power dissipated by the resonator, which may be calculated from the current density and the surface resistance, $R_s$, of the conductor.

To find the optimal capture volume of a particular resonator geometry, a structure may be divided into discrete rings of current. Given a known total current in each annulus, a matrix equation may be employed to solve for the distribution of current among the differential rings within each annulus. Once this is known, a second matrix equation may be used to solve for the distribution of current among the annuli which maximizes capture volume. Each matrix equation may involve generating and inverting matrices with a typical size of 200×200, which allows for fast computation of many different geometries.

Optimal Simulated Annulus Widths and Gaps. FIG. 15 shows a result of a simulation to determine the optimal trace widths and inter-annulus gaps for annular resonators as a function of the number of annuli, assuming a fixed outer diameter of 5.882 in (14.94 cm). The annulus widths, the inter-annulus gaps, and the total current in each annulus were allowed to freely vary, and a numerical search over the parameter space was performed to maximize the capture volume. It was found that adding more annuli increases the optimal capture volume, all else being equal. The optimal geometry depends on the quality factor of the capacitance and the surface resistance of the conductor. However, in general, it tends to consist of one wide outer annulus plus multiple narrow inner annuli. The results of the simulation are shown in Table I. The plots on the top of FIG. 15 show the simulated cross section of the current density flowing through the annular conductors. In the multi-annulus simulations, the optimization tended to find solutions where the current density went to zero on the outer edge of each of the inner annuli.

TABLE I

| N | Q | v(m³) | T(m³) |
|---|---|---|---|
| 1 | 417 | 1.87E−3 | 0.780 |
| 2 | 427 | 1.93E−3 | 0.822 |
| 3 | 431 | 1.96E−3 | 0.846 |
| 4 | 438 | 1.97E−3 | 0.862 |
| 5 | 442 | 1.98E−3 | 0.876 |

Specifically, Table I includes simulation results with $Q_C$=882 and $R_s$=670×10⁻⁶Ω. The simulated copper thickness was 0.004 in (101.6 μm). The simulated value of $Q_C$ was chosen based on a fit to experimental measurement of the LC resonator Q and the simulated value of $Q_L$.

In order to test the general trends found in the simulation, four 95.0 mm diameter annular resonators, shown in FIG. 16, were constructed on FR4 PCB with 2 oz copper traces. Radial gaps were added to each annulus for the addition of capacitors to make the structure resonant. In the case of the multi-annulus resonators, the capacitance in each annulus was chosen to ensure that the current in each annulus matched the optimal distribution of current among the annuli calculated from the simulation. Specifically, FIG. 16 includes a photograph of four annular LC resonators 305*a* . . . 305*d* made from FR4 printed circuit board (PCB), with 2 oz copper traces. The outer diameters of the outermost annuli are all 95.0 mm.

Resonators 305*a* and 305*d* were constructed with the geometry of the optimal one and five-annulus resonators found from simulation, respectively, proportionally re-scaled to a 95.0 mm outer diameter. Resonator 305*c* includes a single annulus with approximately the same width and outer diameter as the outermost annulus of Resonator 305*d*. Resonator 305*b* is identical to resonator 305*a*, except for the placement of the capacitors. As may be appreciated, an annulus may include a loop of a conductive element, such as a loop of conductive wire or conductive tape.

Figure 20:
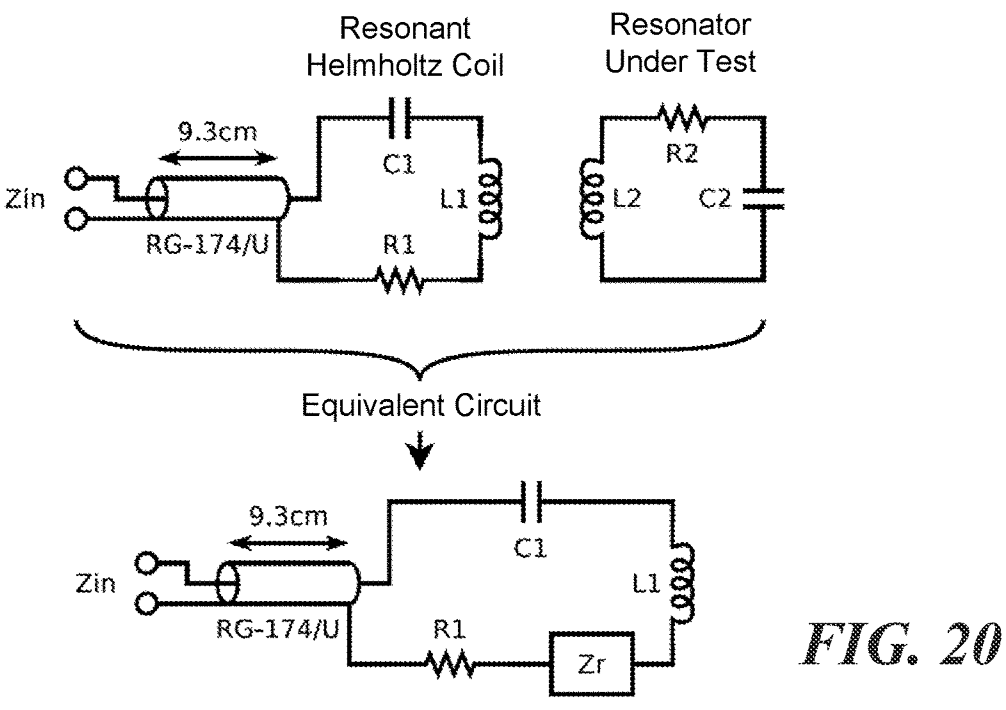
FIG. 20 is a diagram of a resonant Helmholtz coil used to measure resonator dipole volume according to various embodiments of the present disclosure.
Figure 21:
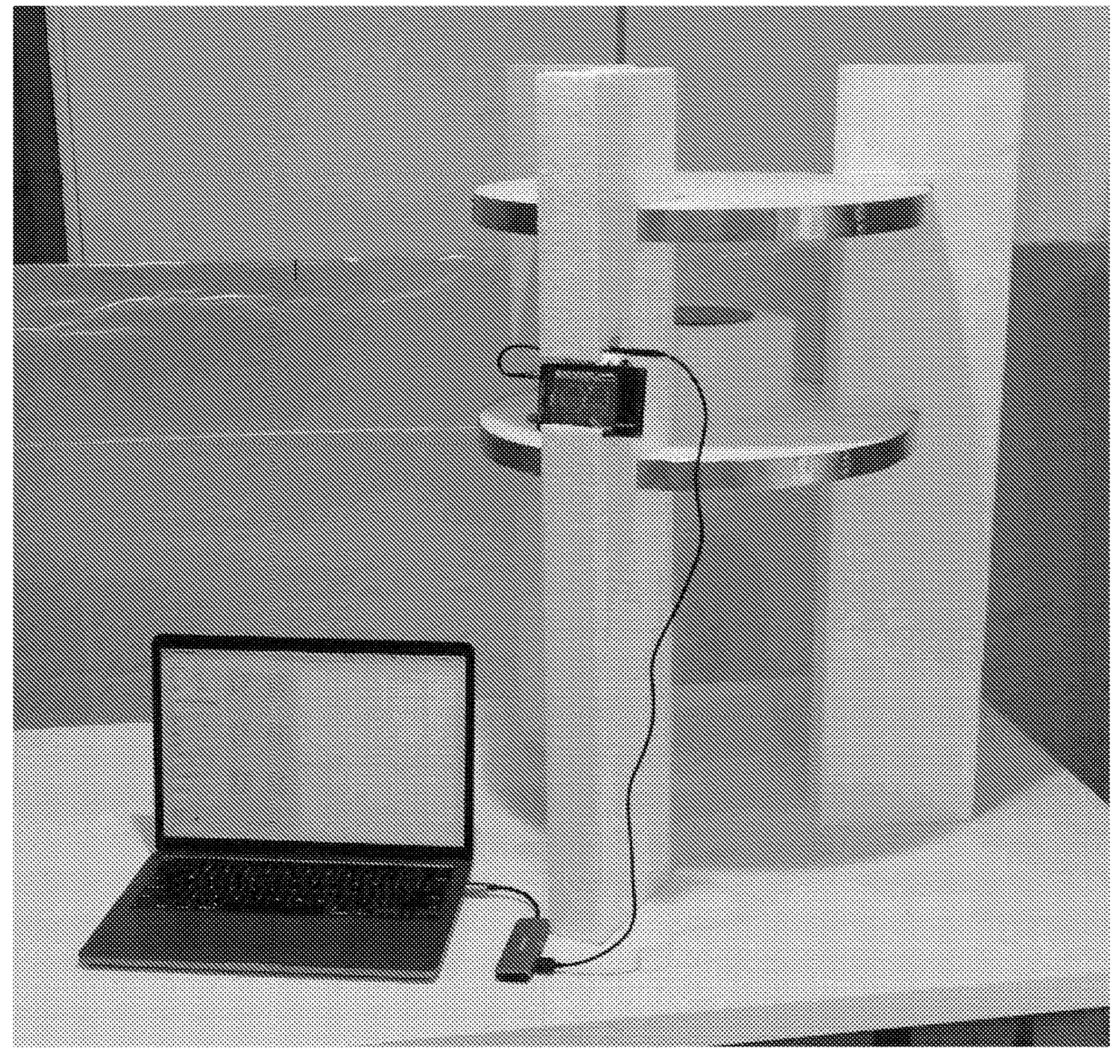
FIG. 21 is a photograph of a resonant Helmholtz coil and test resonator according to various embodiments of the present disclosure.

The resonant frequency, $f_0$, the quality factor, Q, and the dipole volume, v, of each resonator were measured using a series-resonant Helmholtz coil, shown in FIG. 20.

Specifically, FIG. 20 shows a resonant Helmholtz coil used to measure resonator dipole volume. Each loop of the Helmholtz coil includes a single turn of 1 in (2.54 cm) wide copper tape. The upper and lower loops were connected in series, such that they had the same direction of current circulation. Capacitors were added to make the Helmholtz coil series-resonant at 6.9 MHz. Resonators were placed at the mid-point between the two coils, and the input reflection coefficient of the Helmholtz coil was measured as a function of frequency with a NanoVNA.

Because the Helmholtz coil produces a nearly uniform magnetic field in its interior, it is well suited for measuring the interaction between a dipole resonator and a uniform ambient field, which is the property that the dipole volume characterizes. The resonator under test was placed at the mid-point between the two loops of the Helmholtz coil, and the input reflection coefficient of the Helmholtz coil was measured as a function of frequency with a VNA. Once the complex reflection coefficient was measured as a function of the input frequency, a least-squares curve fit was performed using a calibrated model of the Helmholtz coil and a three-parameter model of the resonator.

Figure 22:
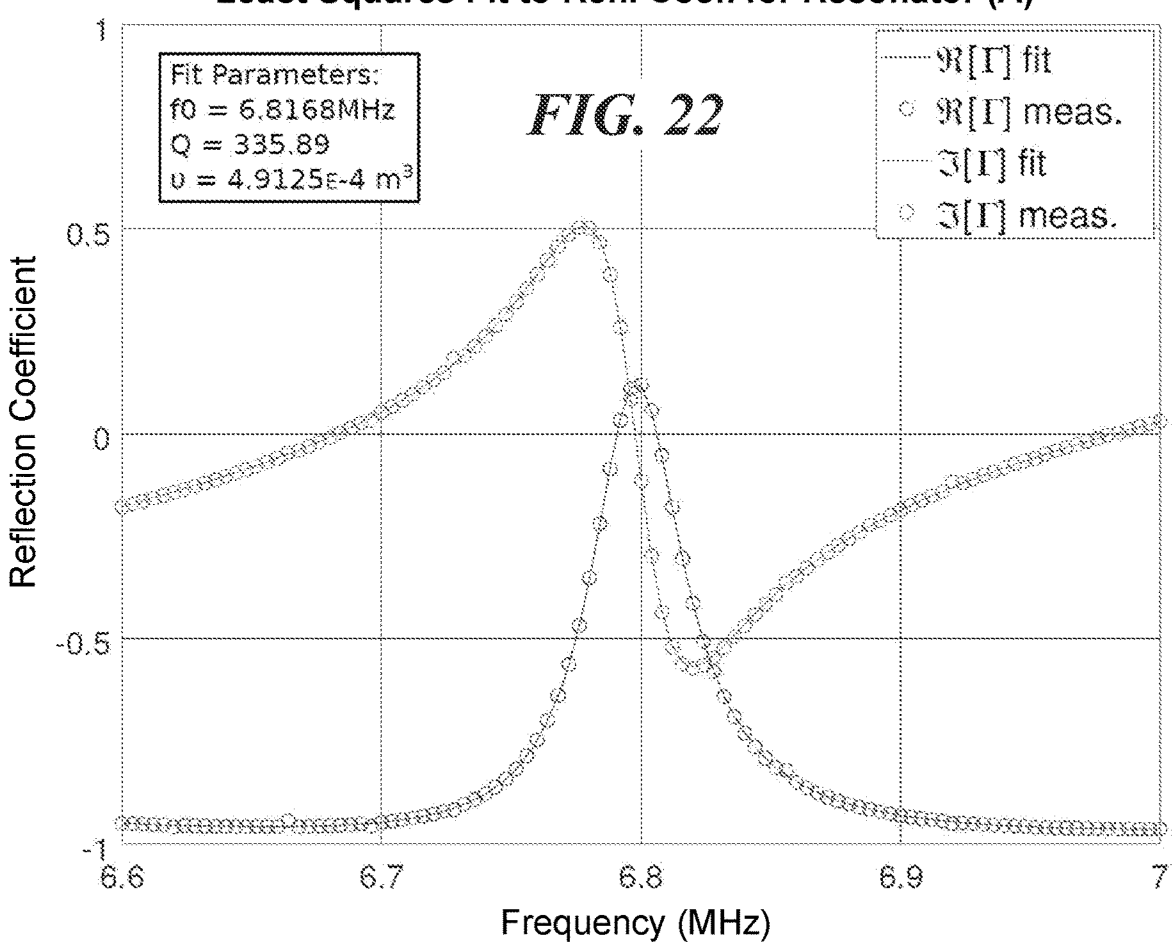
FIG. 22 is a three-parameter least-squares curve fit to a reflection coefficient at an input of the Helmholtz coil.
Figure 23:
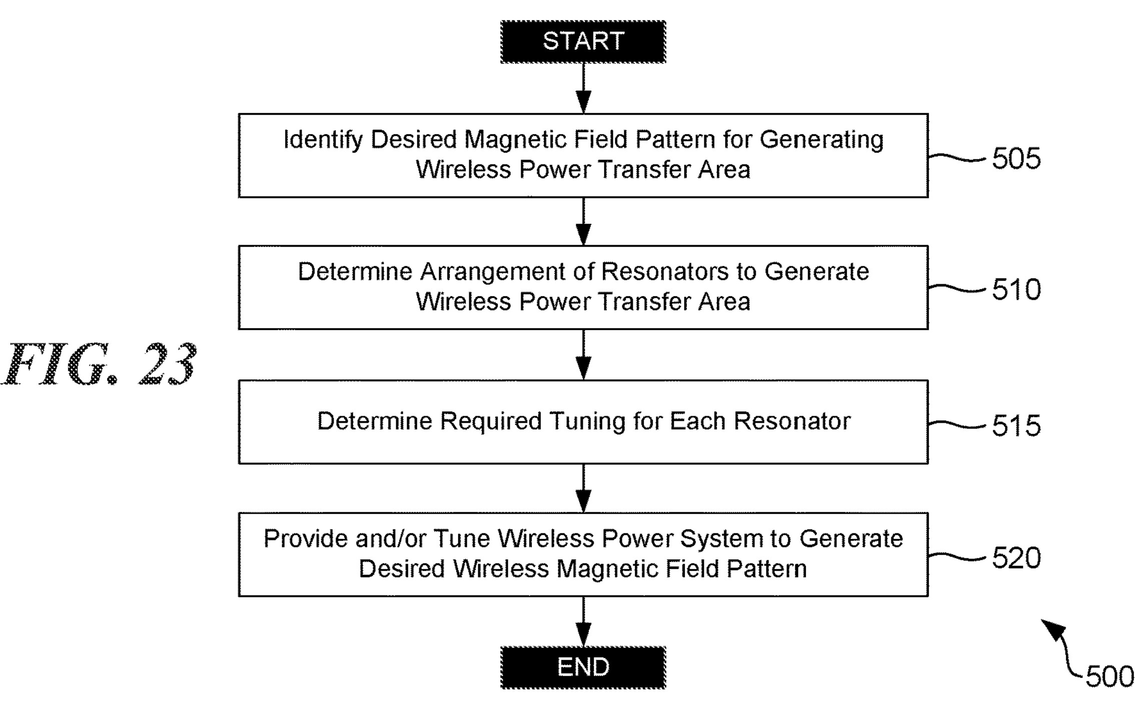
FIG. 23 is a flowchart showing an example wireless power transfer method according to various embodiments of the present disclosure.

FIG. 22 shows an example of a curve fit for Resonator 305*a*. More specifically, FIG. 22 shows an example of a three-parameter least-squares curve fit to the reflection coefficient at the input of the Helmholtz coil when Resonator 305*a* was inside a wireless power transfer area 145. Circles represent data points, and solid lines represent the fit function. The three parameters were the resonant frequency $f_0$, the quality factor, Q, and the dipole volume, v, of the resonator.

The experimental results are shown in Tables II and III. The capture volume, Ψ, in Table II is computed from the product of the measured Q and the measured dipole volume. Table III shows the comparison between the simulated dipole volume and the measured dipole volume of each resonator. The experimental results agree with the trends observed in the simulation. Resonator 305*a* was expected to be the optimal single-annulus receiver, which is consistent with the fact that it had a larger observed capture volume than resonator 305*c*. Likewise, resonator 305*d* was observed to have a larger capture volume than 305*a*, as expected. In all of the resonators, the outermost annulus had a width greater than the width of the ceramic surface-mount capacitors which were being used. Therefore, multiple capacitors could be placed in parallel across the radial gap.

TABLE II

| Resonator | N | $f_0$(MHz) | Q | $\Psi(m^3)$ |
|---|---|---|---|---|
| A | 1 | 6.8168 | 336 | 0.165 |
| B | 1 | 6.8158 | 285 | 0.140 |
| C | 1 | 6.8338 | 315 | 0.156 |
| D | 5 | 6.7982 | 354 | 0.184 |

TABLE III

| Resonator | Sim. $v(m^3)$ | Meas. $v(m^3)$ | % Error |
|---|---|---|---|
| A | 4.82E−4 | 4.91E−4 | −1.8% |
| B | 4.82E−4 | 4.91E−4 | −1.8% |
| C | 4.96E−4 | 5.00E−4 | −0.8% |
| D | 5.09E−4 | 5.21E−4 | −2.3% |

In resonators 305*a*, 305*c*, and 305*d*, the values of the capacitors placed across the radial gap in the outermost annulus were chosen such that the distribution of current flowing through the capacitors matched the simulated current density profile as closely as possible. For resonator 305*b*, the capacitors were moved to various locations and the Q was measured. The measurement listed in Table II shows the case in which the two innermost capacitor slots were left empty. Simply re-arranging the capacitors in this way reduced the Q of the resonator 305*b* by 15% relative to resonator 305*a*, despite the fact that resonators 305*a* and 305*b* had identical copper geometry. The reduction in Q due to capacitor placement seems to be caused by the constriction of current near the radial gap in the annulus. Therefore, to achieve the maximum possible Q, these results suggest that the capacitance distribution across the radial gap should be chosen to match the current distribution as closely as possible.

Both simulated and experimental results show that annular resonant receivers may be improved by constructing them from multiple nested annular conductors with performance improving as the number of annuli is increased, as long as the widths and inter-annulus gaps between the annuli are chosen to have specific, optimal values. In addition, it was found that the distribution of capacitance across the radial gap in each annulus should be chosen to match the current distribution in order to avoid a constriction of the current density, which decreases the Q of the resonator.

Accordingly, a system for wireless power transfer is described that includes a wireless power transfer system 100 configured to generate a desired magnetic field pattern within a wireless power transfer area 145. To this end, the wireless power transfer system 100 includes an amplifier and an arrangement of a plurality of resonators 110 coupled to one another. The plurality of resonators 110 of the wireless power system 100 may be tuned to a required tuning that generates the desired magnetic field pattern. In some embodiments, the required tuning may include an eigenmode with each of the plurality of resonators 110 having a magnitude and a direction of current that generates the desired magnetic field pattern.

The plurality of resonators 110 of the wireless power system may include a plurality of conductive loops, the plurality of conductive loops comprising at least one inner conductive loop 210 and an outer conductive loop 205. The at least one inner conductive loop 210 may be a single inner conductive loop, and a total number of the outer conductive loops 205 may be two. Additionally, the amplifier may be a Class-E amplifier in some embodiments.

The wireless power transfer system 100 may further include at least one distributed radiofrequency (RF) generator 105. As such, the outer conductive loop 205 may be actively driven by the at least one distributed RF generator 105 as an active resonator. The inner loop may be passively driven by the at least one distributed RF generator 105, as may be appreciated. The amplifier may be selected and configured to be driven at an eigenfrequency of a desired eigenmode.

The required tuning may further include a driving frequency determined to be equal to one of a plurality of resonant eigenfrequencies of the arrangement of coupled ones of the plurality of resonators 110. The eigenmode may be predetermined such that the at least one conductive inner loop 210 carries more current than the conductive outer loop 205, thereby amplifying the magnetic field provided by the wireless power transfer system 100. Various RF power sources of the distributed RF generator 105 may be phase-locked via a shared local oscillator or injection-locking.

Turning now to FIG. 22, a flowchart 500 is shown according to a various embodiments. In some embodiments, the flowchart 500 shows an example of a method for wireless power transfer. Starting at 505, a desired magnetic field pattern for generating a wireless power transfer area 145 in which a plurality of receivers (e.g., wireless power receivers 140) may receive power wirelessly may be determined.

At 510, an arrangement of a plurality of resonators 110 to generate the wireless power transfer area may be determined. Next, at 515, a required tuning of each of the plurality of resonators 110 coupled to one another in the arrangement may be determined such that an eigenmode exists for each of the plurality of resonators 110 having a magnitude and frequency that generates the desired magnetic field pattern.

Finally, at 520, a wireless power transfer system 100 may be provided and/or tuned that generates the desired magnetic field pattern, wherein the wireless power transfer system 100 is tuned to the required tuning and comprises the arrangement of the plurality of resonators as determined. The wireless power transfer system 100 as provided may include a plurality of conductive loops 135, wherein the plurality of conductive loops 135 comprise at least one inner loop 210 (e.g., an inner conductive loop) and an outer loop 205 (e.g., an outer conductive loop). The at least one inner conductive loop 210 may be a single inner conductive loop, and a total number of the conductive loops may be two, three, and so forth.

In some embodiments, providing the wireless power transfer system 100 includes providing a distributed RF generator 105, actively driving, using the distributed RF generator 105, the outer conductive loop 205 as an active resonator, wherein the outer conductive loop comprises a plurality of coupled resonators 110, and passively driving, using the distributed RF generator 105, the at least one inner loop 210 as a passive resonator. Further, in some embodiments, providing the wireless power transfer system 100 includes providing an amplifier and driving the amplifier at an angular resonant frequency of a desired eigenmode. The amplifier may be a Class-E amplifier in some embodiments.

In some embodiments, determining the required tuning comprises determining a driving frequency to be equal to one of a plurality of resonant eigenfrequencies for individual ones of the resonators 110 coupled to one another in the arrangement. Individual ones of the resonators 110 coupled to one another in the arrangement may have a corresponding one of a plurality of eigenmodes of oscillation, each with a corresponding resonant eigenfrequency. Further, the required tuning may include eigenvectors and eigenfrequencies determined for individual ones of the plurality of eigenmodes.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, the person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. The terms "first", "second", etc. are used only as labels, rather than a limitation for a number of the objects.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following clauses and claims.

Clause 1. A method for wireless power transfer, comprising: determining a desired magnetic field pattern for generating a wireless power transfer area in which a plurality of receivers may receive power wirelessly; determining an arrangement of a plurality of resonators comprising a direction and a magnitude of current for each of the plurality of resonators, to generate the desired magnetic field within the wireless power transfer area; determining a required tuning of each of the plurality of resonators coupled to one another in the arrangement such that an eigenmode exists with an eigenfrequency equal to a desired driving frequency, and with the direction and the magnitude of the current determined for each of the plurality of resonators being equal to the desired arrangement of current which generates the desired magnetic field pattern; and providing a wireless power system that generates the desired magnetic field pattern, wherein the wireless power system is tuned to the required tuning and comprises the arrangement of the plurality of resonators as determined.

Clause 2. The method of clause 1, wherein the wireless power system as provided comprises a plurality of conductive loops, wherein the plurality of conductive loops comprise at least one inner conductive loop and an outer conductive loop.

Clause 3. The method of clauses 1-2, wherein the at least one inner conductive loop is a single inner conductive loop, and a total number of the conductive loops is two.

Clause 4. The method of clauses 1-3, wherein providing the wireless power system comprises: providing at least one distributed radiofrequency (RF) generator; actively driving, using the at least one distributed RF generator, the outer conductive loop as an active resonator; and passively driving, using the at least one distributed RF generator, the at least one inner loop as a passive resonator.

Clause 5. The method of clauses 1-4, wherein providing the wireless power transfer system further comprises providing an amplifier and driving the amplifier at an angular resonant frequency of a desired eigenmode.

Clause 6. The method of clauses 1-5, wherein the amplifier is a Class-E amplifier.

Clause 7. A system for wireless power transfer, comprising: a wireless power transfer system configured to generate a desired magnetic field pattern within a wireless power transfer area, the wireless power transfer system comprising an amplifier and an arrangement of a plurality of resonators coupled to one another; wherein the plurality of resonators of the wireless power system are tuned to a required tuning that generates the desired magnetic field pattern, wherein the required tuning comprises an eigenmode with each of the plurality of resonators having a magnitude and a direction of current that generates the desired magnetic field pattern.

Clause 8. The system of clause 7, wherein the plurality of resonators of the wireless power system comprise a plurality of conductive loops, the plurality of conductive loops comprising at least one inner conductive loop and an outer conductive loop.

Clause 9. The system of clauses 7-8, wherein the at least one inner conductive loop is a single inner conductive loop, a total number of the conductive loops is two, and the amplifier is a Class-E amplifier.

Clause 10. The system of clauses 7-9, wherein the wireless power system comprises: at least one distributed radiofrequency (RF) generator; wherein the outer conductive loop is actively driven by the at least one distributed RF generator as an active resonator; and wherein the inner loop is passively driven by the at least one distributed RF generator.

Clause 11. The system of clauses 7-10, wherein the amplifier is configured to be driven at an eigenfrequency of a desired eigenmode.

Clause 12. The system of clauses 7-11, wherein the required tuning further comprises a driving frequency determined to be equal to one of a plurality of resonant eigenfrequencies of the arrangement of coupled ones of the plurality of resonators.

Clause 13. The system of clauses 7-12, wherein the eigenmode is predetermined such that the at least one conductive inner loop carries more current than the conductive outer loop, thereby amplifying the magnetic field provided by the wireless power transfer system.

Clause 14. The system of clauses 7-13, wherein RF power sources of the distributed RF generator are phase-locked via a shared local oscillator or injection-locking.

Clause 15. A method for self-tuning a resonator, comprising: positioning one of a plurality of resonators to be tuned within a resonator array to construct the resonator array to have a uniform eigenmode from identical ones of the plurality of resonators, each of the plurality of resonators having an intrinsic frequency re-tuned based on a presence or an absence of its nearest neighbors.

Clause 16. The method of clause 15, wherein each of the plurality of resonators comprises switched inductors, switched capacitors, or a combination thereof.

Clause 17. A method for providing a magnetic field, comprising: providing a two-dimensional annular receiver configured to absorb power from an ambient magnetic field, the two-dimensional annular receiver comprising an outer annular and at least one inner annular positioned within the outer annular; and selecting a width, gap, and/or current carried by the outer annular and the at least one inner annular to be varied to optimize power absorbed by the two-dimensional annular receiver from the ambient magnetic field.

Clause 18. The method of clause 17, wherein: the at least one inner annular comprises a plurality of inner annulus; and the outer annular has a width greater than the plurality of inner annulus.

Clause 19. The method of clauses 17-18, further comprising positioning a capacitor as a terminal end of at least one of the outer annular or the at least one inner annular.

Therefore, the following is claimed:

1. A method for wireless power transfer, comprising:

determining a desired magnetic field pattern for generating a wireless power transfer area in which a plurality of receivers may receive power wirelessly;

arranging a plurality of resonators to control a direction and a magnitude of current for each of the plurality of resonators, to generate the desired magnetic field within the wireless power transfer area, wherein arranging the plurality of resonators is in a loop of segments connected in series, each of the segments comprising a radio frequency (RF) generator;

determining a required tuning of each of the plurality of resonators coupled to one another in the arrangement such that an eigenmode exists with an eigenfrequency equal to a desired driving frequency, and with the direction and the magnitude of the current determined for each of the plurality of resonators being equal to the desired arrangement of current which generates the desired magnetic field pattern; and providing a wireless power system that generates the desired magnetic field pattern, wherein providing the wireless power system comprises providing a plurality of conductive loops including at least one inner conductive loop and an outer conductive loop, the outer conductive loop comprises the loop of segments, each of the segments comprising the RF generator and one or more of the plurality of resonators connected in series by wires, and the at least one inner conductive loop is also formed as a series of wired connections.

2. The method of claim 1, wherein the at least one inner conductive loop is a single inner conductive loop, and a total number of the plurality of conductive loops is two.

3. The method of claim 1, wherein providing the wireless power system comprises:

actively driving, using the RF generator of each of the segments, the outer conductive loop as an active resonator; and passively driving, using the RF generator of each of the segments of the outer conductive loop, the at least one inner conductive loop as a passive resonator.

4. The method of claim 3, wherein providing the wireless power transfer system further comprises providing an amplifier and driving the amplifier at an angular resonant frequency of a desired eigenmode.

5. The method of claim 4, wherein the amplifier is a Class-E amplifier.

6. A system for wireless power transfer, comprising:

a wireless power transfer system configured to generate a desired magnetic field pattern within a wireless power transfer area, the wireless power transfer system comprising an amplifier and a plurality of resonators coupled to one another, wherein the plurality of resonators is in a loop of segments connected in series, each of the segments comprising a radio frequency (RF) generator;

the plurality of resonators is tuned to a required tuning that generates the desired magnetic field pattern, wherein the required tuning comprises an eigenmode with each of the plurality of resonators having a magnitude and a direction of current that generates the desired magnetic field pattern, the wireless power transfer system comprises a plurality of conductive loops, the plurality of conductive loops comprising at least one inner conductive loop and an outer conductive loop, the outer conductive loop comprises the loop of segments, each of the segments comprising the RF generator and one or more of the plurality of resonators connected in series by wires, and the at least one inner conductive loop is also formed as a series of wired connections.

7. The system of claim 6, wherein the at least one inner conductive loop is a single inner conductive loop, a total number of the plurality of conductive loops is two, and the amplifier is a Class-E amplifier.

8. The system of claim 6, wherein the outer conductive loop is actively driven by the RF generator of each of the segments as an active resonator; and the at least one inner conductive loop is passively driven by the RF generator of each of the segments of the outer conductive loop.

9. The system of claim 6, wherein the amplifier is configured to be driven at an eigenfrequency of a desired eigenmode.

10. The system of claim 6, wherein the required tuning further comprises a driving frequency determined to be equal to one of a plurality of resonant eigenfrequencies of the arrangement of coupled ones of the plurality of resonators.

11. The system of claim 6, wherein the eigenmode is predetermined such that the at least one conductive inner loop carries more current than the-outer conductive loop, thereby amplifying the magnetic field provided by the wireless power transfer system.

12. The system of claim 10, wherein RF power sources of the RF generator of each of the segments are phase-locked via a shared local oscillator or injection-locking.

* * * * *